(12) United States Patent
Zhou et al.

(10) Patent No.: US 12,537,624 B2
(45) Date of Patent: Jan. 27, 2026

(54) DELAYED SEMI-PERSISTENT SCHEDULING HARQ-ACK WITH PHYSICAL UPLINK CHANNEL REPETITION

(71) Applicant: QUALCOMM Incorporated, San Diego, CA (US)

(72) Inventors: Yan Zhou, San Diego, CA (US); Tianyang Bai, Somerville, NJ (US); Konstantinos Dimou, New York, NY (US); Yi Huang, San Diego, CA (US); Ahmed Elshafie, San Diego, CA (US); Jing Sun, San Diego, CA (US); Seyedkianoush Hosseini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 18/043,300

(22) PCT Filed: Oct. 19, 2021

(86) PCT No.: PCT/US2021/055526
§ 371 (c)(1),
(2) Date: Feb. 27, 2023

(87) PCT Pub. No.: WO2022/093569
PCT Pub. Date: May 5, 2022

(65) Prior Publication Data
US 2023/0261791 A1 Aug. 17, 2023

(30) Foreign Application Priority Data
Oct. 27, 2020 (GR) .............................. 20200100648

(51) Int. Cl.
*H04W 4/00* (2018.01)
*H04L 1/08* (2006.01)
(Continued)

(52) U.S. Cl.
CPC ............... *H04L 1/08* (2013.01); *H04W 72/02* (2013.01); *H04W 72/23* (2023.01); *H04L 5/0044* (2013.01)

(58) Field of Classification Search
CPC ................................................. H04L 47/70–83
See application file for complete search history.

(56) References Cited

U.S. PATENT DOCUMENTS

2019/0165847 A1   5/2019  Kim et al.
2021/0226759 A1\*  7/2021  Takeda ................. H04L 1/1887
(Continued)

FOREIGN PATENT DOCUMENTS

CN    108781143 A    11/2018
EP    3684123 A1     7/2020
WO    2018164495 A1  9/2018

OTHER PUBLICATIONS

International Search Report and Written Opinion—PCT/US2021/055526—ISA/EPO—Apr. 7, 2022.
(Continued)

*Primary Examiner* — Bob A Phunkulh
(74) *Attorney, Agent, or Firm* — ArentFox Schiff, LLP and Qualcomm, Incorporated

(57) ABSTRACT

Apparatus, methods, and computer-readable media for multiplexing of overlapped uplink channel transmission repetitions are disclosed herein. A user equipment (UE) may determine whether a first subset of a first set of uplink channel transmission repetitions overlaps with a downlink transmission and determine whether to transmit a second subset of the first set of uplink channel transmission repeti-
(Continued)

tions when the first subset overlaps with the downlink transmission. In some aspects, the second subset includes one or more uplink channel transmission repetitions that do not overlap with the downlink transmission. The UE may transmit, to a base station over an uplink channel, a second set of uplink channel transmission repetitions having the first subset and the second subset of the first set of uplink channel transmission repetitions when the second subset is determined to be transmitted. Thus, the reliability of uplink repetitions can be increased.

18 Claims, 14 Drawing Sheets

(51) Int. Cl.
*H04W 72/02* (2009.01)
*H04W 72/23* (2023.01)
*H04L 5/00* (2006.01)

(56) References Cited

U.S. PATENT DOCUMENTS

| 2021/0297191 A1* | 9/2021 | Takeda | H04L 1/1825 |
| 2021/0336726 A1* | 10/2021 | Takeda | H04L 1/1825 |
| 2022/0116152 A1* | 4/2022 | Iyer | H04L 1/1819 |

OTHER PUBLICATIONS

Partial International Search Report—PCT/US2021/055526—ISA/ EPO—Feb. 9, 2022.
Vivo: "Discussion on Solutions for PUCCH Coverage Enhancement", 3GPP TSG-RAN WG1 #103-e, R1-2008942, 3rd Generation Partnership Project, Mobile Competence Centre, 650, Route Des Lucioles , F-06921 Sophia-Antipolis Cedex, France, vol. RAN WG1, No. e-Meeting, Oct. 26, 2020-Nov. 13, 2020, Oct. 23, 2020, XP051945432, 11 Pages, Sections 3.1-3.3, 3.4, p. 3-p. 8.
Xiaomi: "HARQ-ACK Feedback Enhancement for URLLC/IIoT", 3GPP Draft, 3GPP TSG RAN WG1 #103, R1-2007900, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020 (Oct. 23, 2020), XP051945299, 3 Pages, the Whole Document.
LG Electronics: "Downlink control channel related issues for MTC", 3GPP TSG RAN WG1 Meeting #80, R1-150199, Athens, Greece, Feb. 9-13, 2015, pp. 1-9.

* cited by examiner

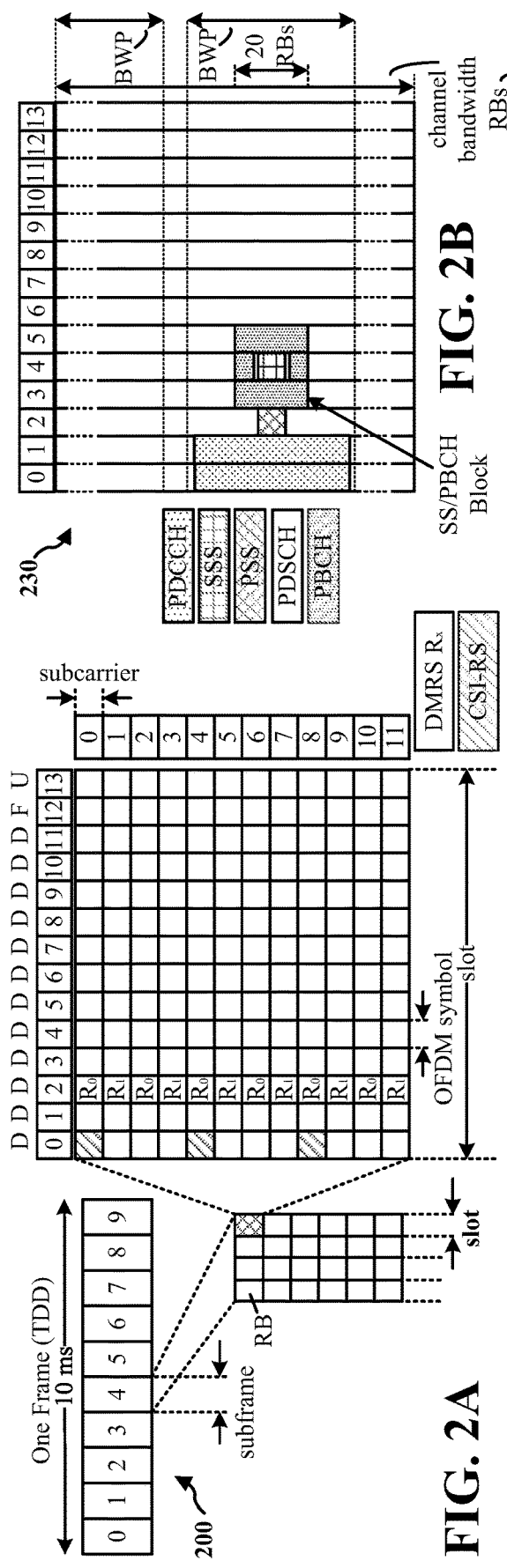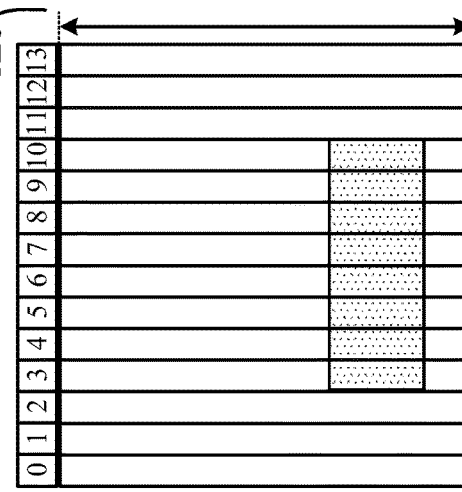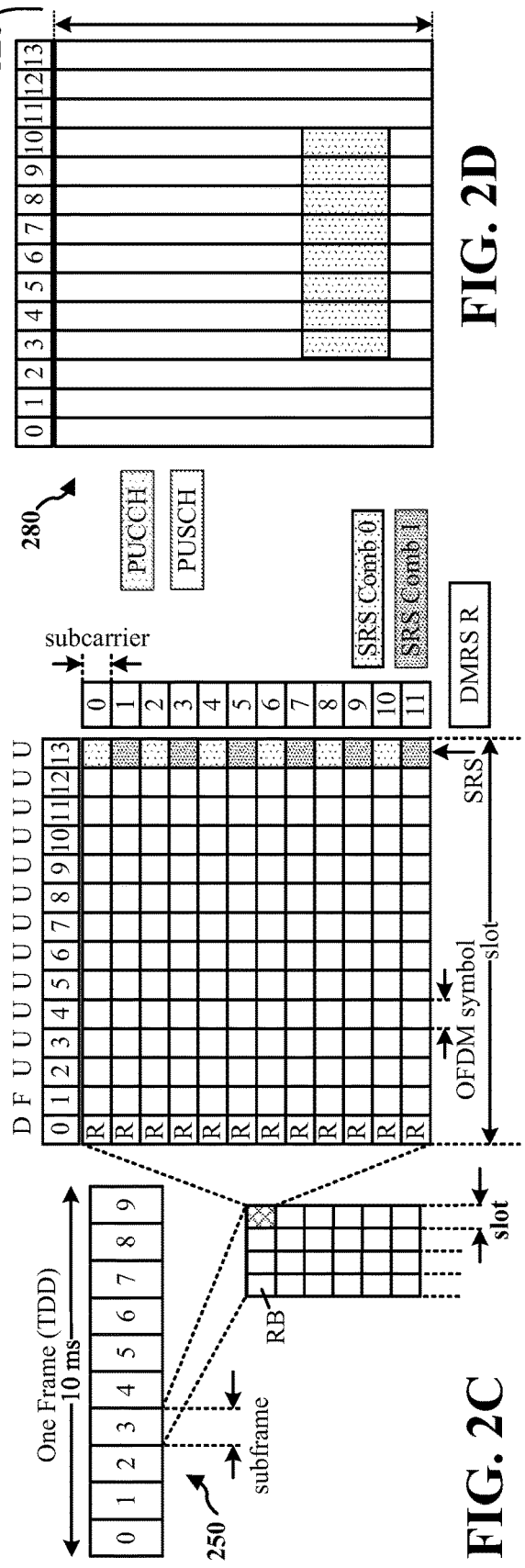
FIG. 2A  FIG. 2B  FIG. 2C  FIG. 2D

DELAYED SEMI-PERSISTENT SCHEDULING HARQ-ACK WITH PHYSICAL UPLINK CHANNEL REPETITION

CROSS REFERENCE TO RELATED APPLICATION(S)

This application is a National Phase entry of PCT Application No. PCT/US2021/055526, entitled "DELAYED SEMI-PERSISTENT SCHEDULING HARQ-ACK WITH PHYSICAL UPLINK CHANNEL REPETITION" and filed on Oct. 19, 2021, which claims priority of Greek application No. 20200100648, entitled "DELAYED SEMI-PERSISTENT SCHEDULING HARQ-ACK WITH PHYSICAL UPLINK CHANNEL REPETITION" and filed on Oct. 27, 2020, both of which are expressly incorporated by reference herein in their entirety.

BACKGROUND

Technical Field

The present disclosure relates generally to wireless communication, and more particularly, to techniques for delayed semi-persistent scheduling hybrid automatic repeat request (HARD)-acknowledgment (ACK) with physical uplink channel repetition.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In uplink repetitions, two PUCCH sequences may overlap with one another over at least one slot (e.g., in a slot-based procedure). A user equipment (UE) may be configured to transmit physical uplink control channel (PUCCH) in a set of symbols, and the UE may detect a dynamic grant (e.g., downlink control information (DCI) 2_0) indicating a subset of the set of symbols as a downlink data transmission or other flexible downlink signaling. In other examples, the UE may detect other types of DCI (e.g., DCI 1_0/1_1/0_1) indicating channel state information reference signal (CSI-RS) or physical downlink shared channel (PDSCH) in a subset of the set of symbols. In some approaches of facilitating uplink repetitions, after some processing time (e.g., about two symbols from end of DCI) to decode the DCI associated with the PDSCH, for example, the UE may cancel (or drop) the PUCCH from the subset of symbols. In some examples, in the case of a PUCCH repetition, the UE may only cancel the PUCCH repetition overlapped with a DG PDSCH. In some aspects, the UE may avoid SPS HARQ-ACK dropping for time division duplex (TDD) due to a potential PUCCH collision with at least one downlink symbol or flexible symbol. In some aspects, a dropped SPS ACK/NACK signal due to a dynamic slot format indication (SFI) or dynamic grant (DG), a semi-static TDD can be retransmitted by the UE.

As described above, when an SPS-based uplink repetition carrying HARQ-ACK information overlaps with a DG PDSCH, the uplink repetition is dropped. However, this approach in handling overlapped uplink repetitions with SPS HARQ-ACK information requires additional resources to retransmit downlink data when a dropped uplink repetition carries SPS HARQ-ACK information.

The subject technology provides for delaying transmission of uplink repetitions, including both dropped and remaining uplink repetitions. In this regard, the subject technology increases the efficiency and reliability of uplink repetition transmissions by facilitating the delay of overlapped uplink repetitions with SPS HARQ-ACK information.

In an aspect of the disclosure, a method, a computer-readable medium, and an apparatus are provided. The apparatus may be a UE. The apparatus is configured to determine whether a first subset of a first set of uplink channel transmission repetitions overlaps with at least a portion of a downlink transmission. The apparatus is also configured to determine whether to transmit a second subset of the first set of uplink channel transmission repetitions when the first subset overlaps with the at least a portion of the downlink transmission, in which the second subset includes one or more uplink channel transmission repetitions that do not overlap with the downlink transmission. The apparatus is also configured to transmit, to a base station over an uplink channel, a second set of uplink channel transmission repetitions comprising the first subset and the second subset of the first set of uplink channel transmission repetitions when the second subset is determined to be transmitted, in which the second set of uplink channel transmission repetitions does not overlap with the downlink transmission.

In an aspect of the disclosure, a method, a computer-readable medium, and an apparatus are provided. The apparatus may be a base station. The apparatus is configured to transmit, to a user equipment (UE) over a downlink channel, a first downlink transmission comprising a configuration indicating a request to retransmit a first subset of a first set of uplink channel transmission repetitions that overlaps with at least a portion of a second downlink transmission. The apparatus is also configured to receive, from the UE over an uplink channel, a second set of uplink channel transmission repetitions comprising the first subset of the first set of uplink channel transmission repetitions and a second subset of the first set of uplink channel transmission repetitions, the second subset comprising one or more uplink channel transmission repetitions that do not overlap with the second downlink transmission, in which the second set of uplink channel transmission repetitions does not overlap with the second downlink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
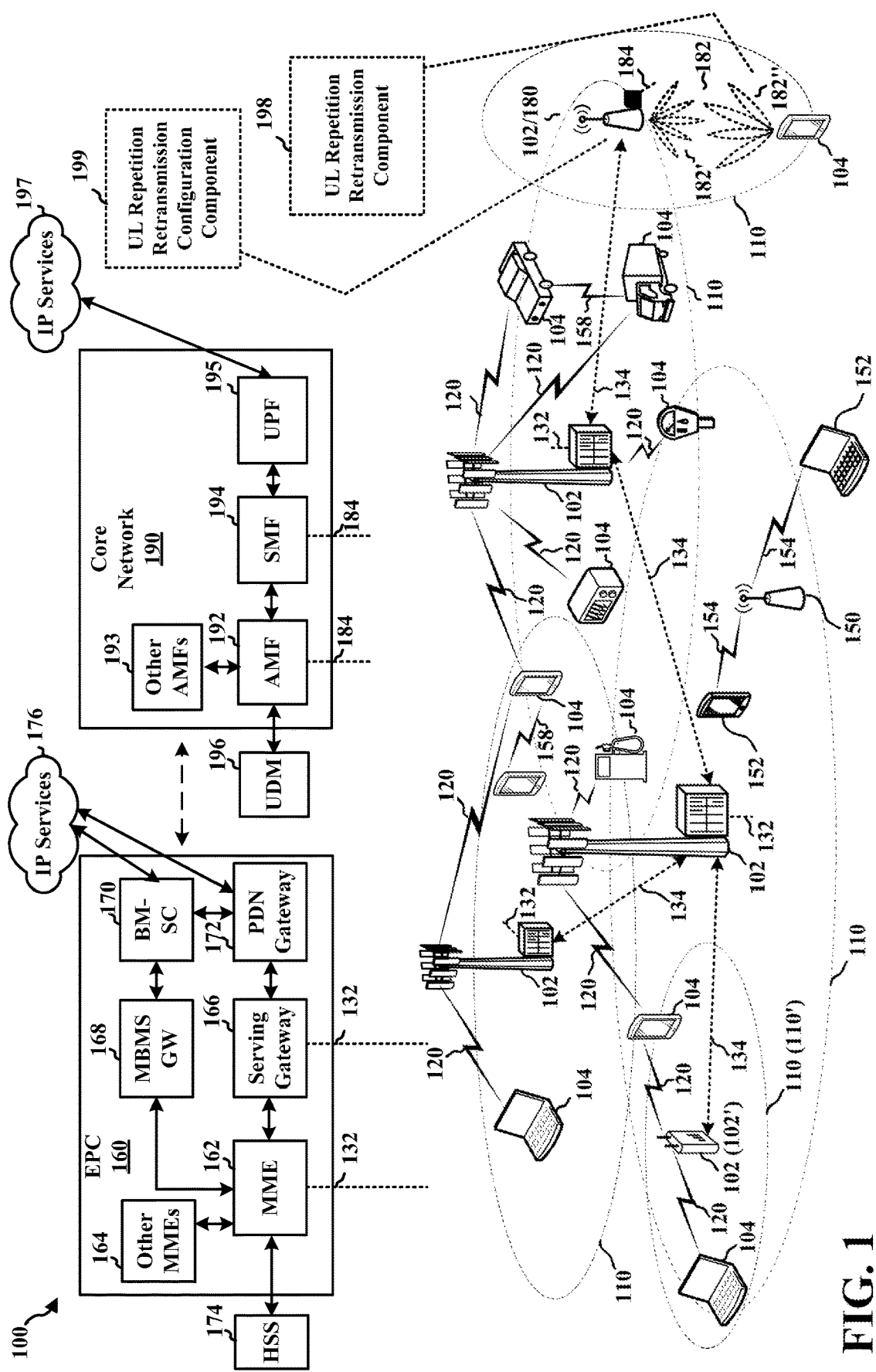
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an uplink repetition retransmission component 198 that is configured to determine whether a first subset of a first set of uplink channel transmission repetitions overlaps with at least a portion of a downlink transmission. The uplink repetition retransmission component 198 is also configured to determine whether to transmit a second subset of the first set of uplink channel transmission repetitions when the first subset overlaps with the at least a portion of the downlink transmission, in which the second subset includes one or more uplink channel transmission repetitions that do not overlap with the downlink transmission. The uplink repetition retransmission component 198 is also configured to transmit, to a base station over an uplink channel, a second set of uplink channel transmission repetitions comprising the first subset and the second subset of the first set of uplink channel transmission repetitions when the second subset is determined to be transmitted, in which the second set of uplink channel transmission repetitions does not overlap with the downlink transmission.

Referring still to FIG. 1, in certain aspects, the base station 102/180 may include an uplink repetition retransmission configuration component 199 that is configured to transmit, to a user equipment (UE) over a downlink channel, a first downlink transmission comprising a configuration indicating a request to retransmit a first subset of a first set of uplink channel transmission repetitions that overlaps with at least a portion of a second downlink transmission. The uplink repetition retransmission configuration component 199 is also configured to receive, from the UE over an uplink channel, a second set of uplink channel transmission repetitions comprising the first subset of the first set of uplink channel transmission repetitions and a second subset of the first set of uplink channel transmission repetitions, the second subset comprising one or more uplink channel transmission repetitions that do not overlap with the second downlink transmission, in which the second set of uplink channel transmission repetitions does not overlap with the second downlink transmission.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

In uplink repetitions, two PUCCH sequences may overlap with one another over at least one slot (e.g., in a slot-based procedure). A UE may be configured to transmit PUCCH in a set of symbols, and the UE may detect a dynamic grant (e.g., DCI 2_0) indicating a subset of the set of symbols as a downlink data transmission or other flexible downlink signaling. In other examples, the UE may detect other types of DCI (e.g., DCI 1_0/1_1/0_1) indicating CSI-RS or PDSCH in a subset of the set of symbols. In some approaches of facilitating uplink repetitions, after some processing time (e.g., about two symbols from end of DCI) to decode the DCI associated with the PDSCH, for example, the UE may cancel (or drop) the PUCCH from the subset of symbols. In some examples, in the case of a PUCCH repetition, the UE may only cancel the PUCCH repetition overlapped with a DG PDSCH. In some aspects, the UE may avoid SPS HARQ-ACK dropping for TDD due to a potential PUCCH collision with at least one downlink symbol or flexible symbol. In some aspects, a dropped SPS ACK/NACK signal due to a dynamic SFI or dynamic grant (DG), a semi-static TDD can be retransmitted by the UE. As described above, when an SPS-based uplink repetition carrying HARQ-ACK information overlaps with a DG PDSCH, the uplink repetition is dropped. However, this approach in handling overlapped uplink repetitions with SPS HARQ-ACK information requires additional resources to retransmit downlink data when a dropped uplink repetition carries SPS HARQ-ACK information.

The subject technology provides for delaying transmission of uplink repetitions, including both dropped and remaining uplink repetitions. In this regard, the subject technology increases the efficiency and reliability of uplink repetition transmissions by facilitating the delay of overlapped uplink repetitions with SPS HARQ-ACK information.

Figure 3:
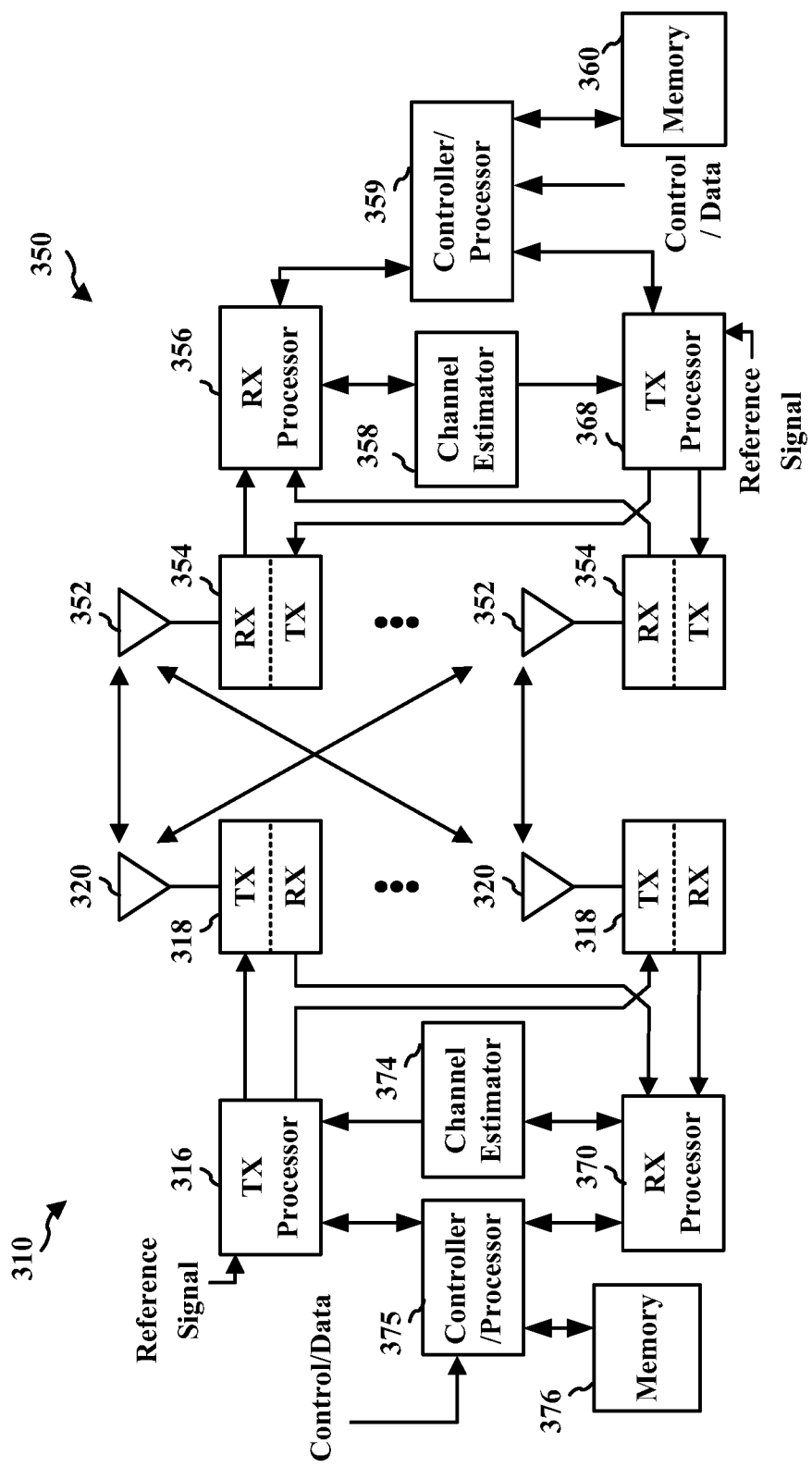
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
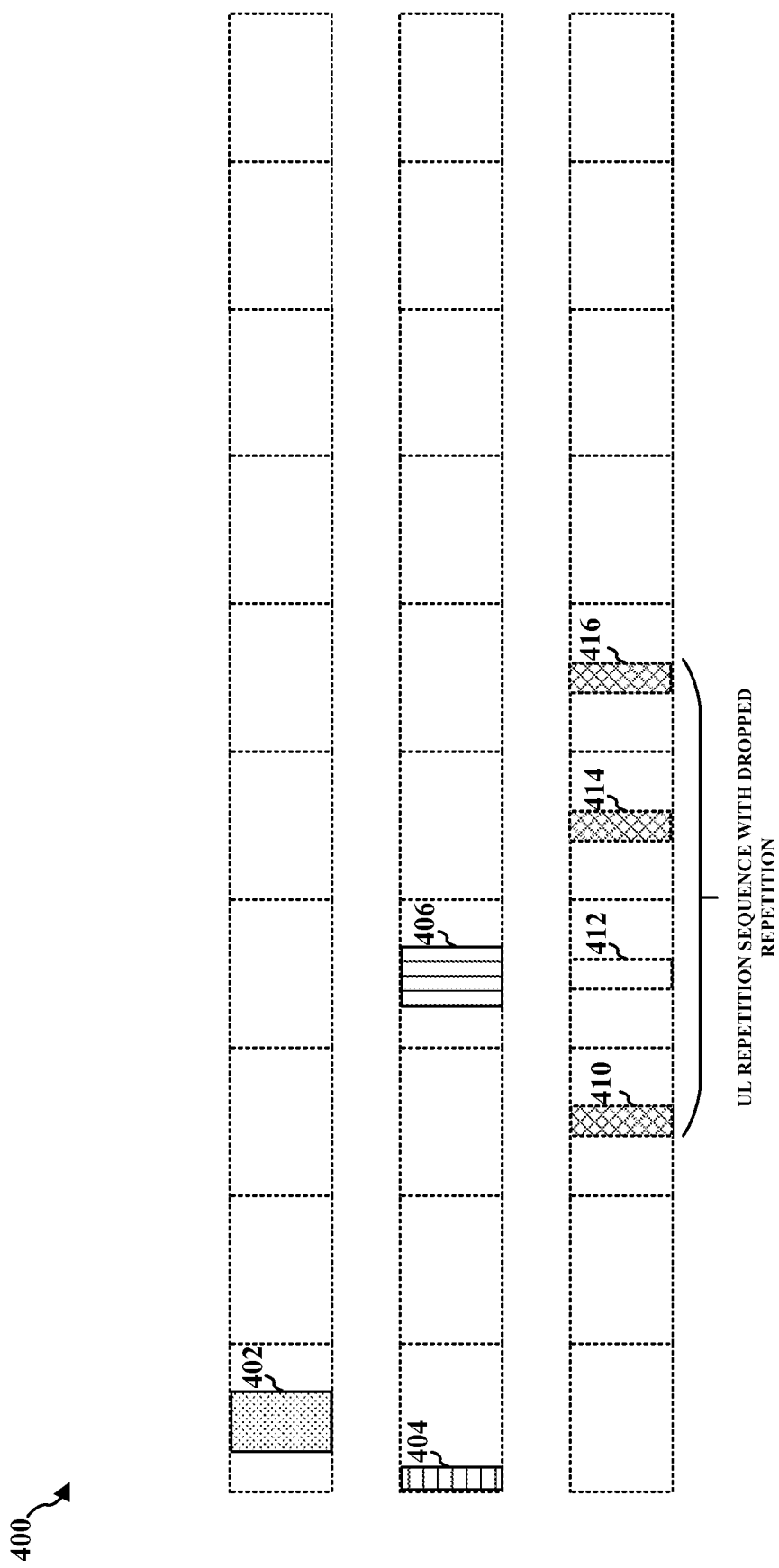
FIG. 4 is a diagram illustrating an example of an uplink repetition sequence with a dropped repetition, in accordance with some aspects of the present disclosure.

FIG. 4 is a diagram illustrating an example 400 of an uplink repetition sequence with a dropped repetition, in accordance with some aspects of the present disclosure. The example 400 includes a first SPS PDSCH 402, a PDCCH 404, and a DG PDSCH 406. The example 400 illustrates a first set of uplink channel transmission repetitions that includes uplink repetitions 410, 412, 414, 416. The UE can determine that uplink repetition 412 overlaps with at least a portion of the DG PDSCH 406. Consequently, the sequence comprised of uplink repetitions 412, 414, 416 may be dropped due to the one overlapping repetition (e.g., 412).

In some aspects, the user equipment may avoid SPS HARQ-ACK dropping for time division duplex (TDD) due to a potential PUCCH collision with at least one downlink symbol or flexible symbol. In some aspects, a dropped SPS ACK/NACK signal due to a dynamic slot format indication (SFI) or dynamic grant (DG), a semi-static TDD can be retransmitted by the user equipment. In some aspects, the retransmission of a dropped SPS A/N may occur based on an UE-based implicit rule, where a dropped SPS A/N may be delayed until first available uplink symbols can fit in a PUCCH resource. For example, the earliest uplink symbols may be the earliest available occasion without overlapping of any downlink transmission and/or symbol among a set of configured occasions, which can correspond to a configured PUCCH/PUSCH resource (e.g. on symbol 10 and 11 in every slot). In other examples, the base station (e.g., gNB) can indicate multiple k1 values through SPS signaling. For each SPS PDSCH, the UE can select the first k1 value that results in a valid PUCCH resource. In other examples, the base station 120/180 can use a type-3 codebook to request retransmission of a dropped SPS A/N. For example, the base station may request the user equipment to transmit ACK/NACK for SPS HARQ identifiers with a dropped ACK/NACK. In another example, the base station may request the user equipment to transmit ACK/NACK for all SPS HARQ identifiers. In some aspects, a first subset of PUCCH repetitions may be dropped, and a second subset of PUCCH repetitions remain. In some aspects, the base station 120/180 may enable a feature to retransmit dropped SPS ACK/NACK, such that the first subset of PUCCH repetitions can be retransmitted based on an indication from the base station. In other aspects, the user equipment may determine whether to retransmit the remaining uplink repetitions with at least one original uplink repetition dropped. In some aspects, the user equipment determines the location of the retransmitted uplink repetitions.

Figure 5:
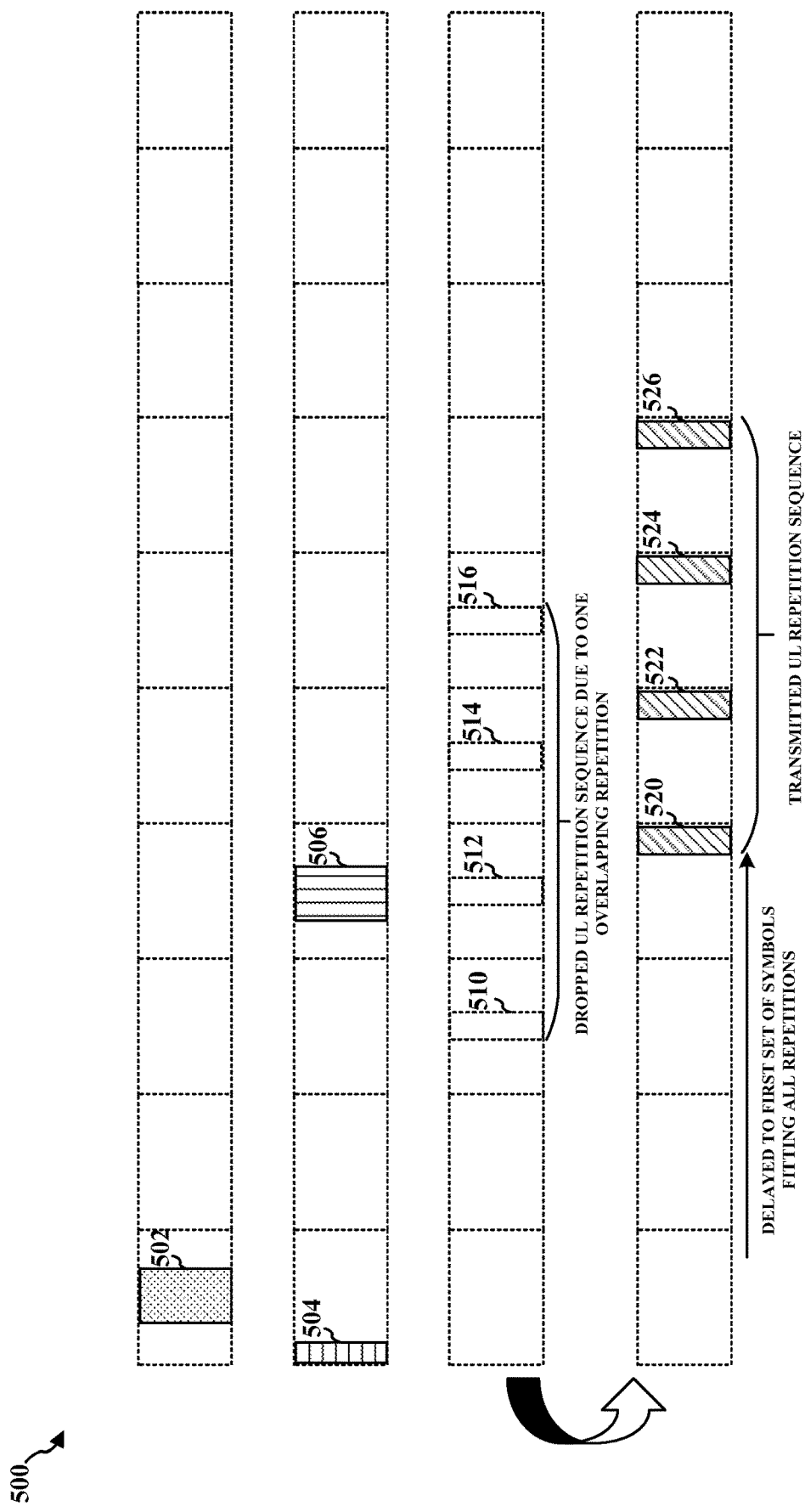
FIG. 5 is a diagram illustrating an example of a transmitted uplink repetition sequence, in accordance with some aspects of the present disclosure.

FIG. 5 is a diagram illustrating an example 500 of a transmitted uplink repetition sequence, in accordance with some aspects of the present disclosure. The example 500 includes a first SPS PDSCH 502, a PDCCH 504, and a DG PDSCH 506. The example 500 illustrates a first set of uplink channel transmission repetitions that includes uplink repetitions 510, 512, 514, 516. The UE can determine that uplink repetition 512 overlaps with at least a portion of the DG PDSCH 506. Consequently, the sequence comprised of uplink repetitions 512, 514, 516 is dropped due to the one overlapping repetition (e.g., 512).

In some aspects, the dropped uplink repetition sequence may be delayed and retransmitted at a later time based on first available symbols that can fit the dropped uplink repetitions. In some aspects, the user equipment can receive, from the base station over a downlink channel, control information indicating a resource allocation, a predetermined repetition pattern and a starting location per repetition occasion for the second set of uplink channel transmission repetitions (e.g., 520, 522, 524, 526). In some aspects, the user equipment can delay transmission of the second set of uplink channel transmission repetitions to a starting repetition occasion based on the resource allocation. In some aspects, the starting repetition occasion includes one or more first available uplink symbols that correspond to a configured uplink physical channel resource. In some aspects, the user equipment can delay each uplink channel transmission repetition in the second set of uplink channel transmission repetitions to a designated location within each repetition occasion for a number of repetition occasions corresponding to a number of total repetitions in the second set of uplink channel transmission repetitions. In some aspects, each uplink channel transmission repetition in the second set of uplink channel transmission repetitions has one or more of a same time location or same frequency location with a respective repetition occasion based on the predetermined repetition pattern. For example, the uplink repetitions can be delayed to the last symbol per slot across four slots starting with a slot number containing the DG PDSCH 506.

Figure 6:
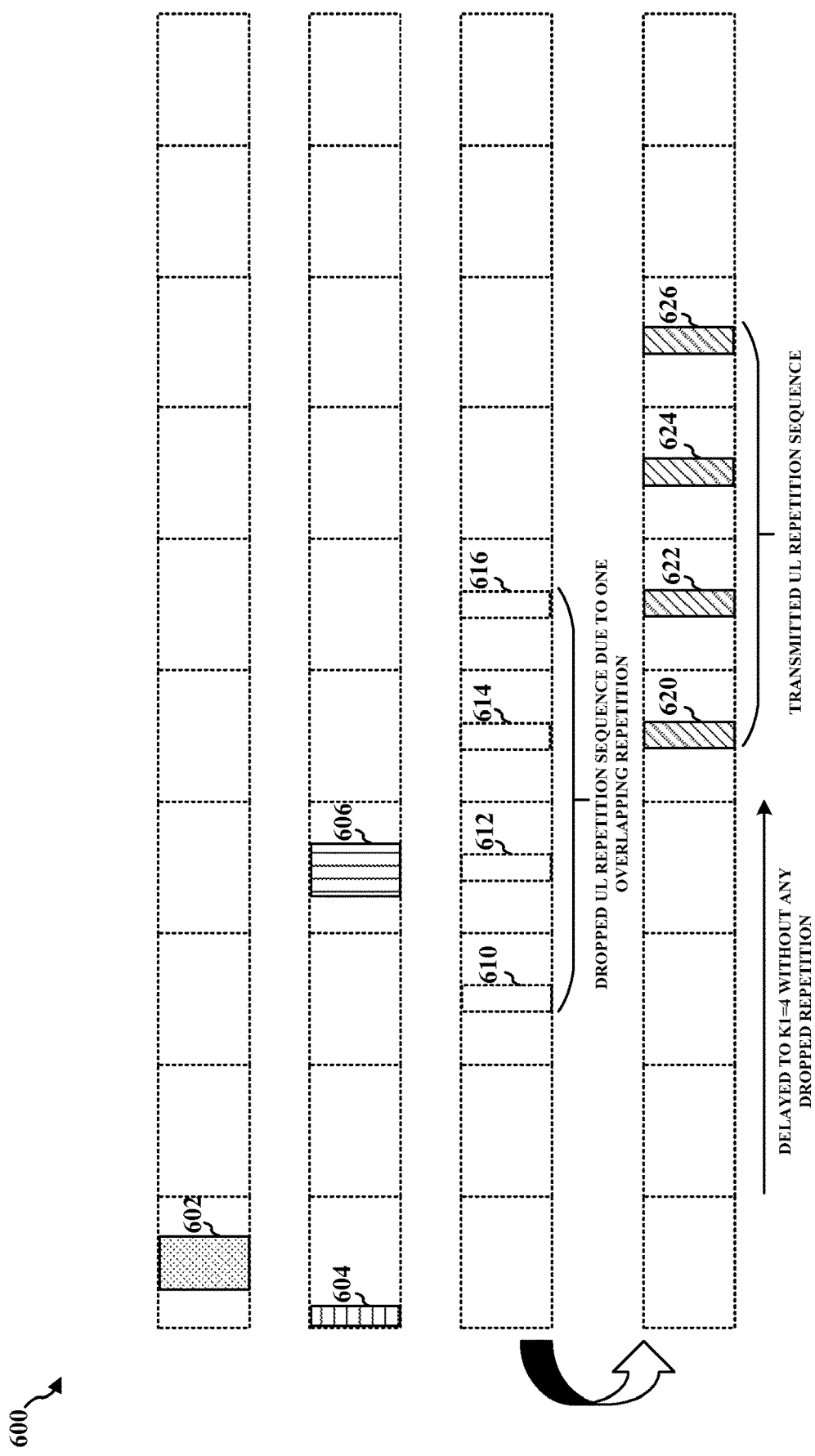
FIG. 6 is a diagram illustrating another example of a transmitted uplink repetition sequence, in accordance with some aspects of the present disclosure.

FIG. 6 is a diagram illustrating another example 600 of a transmitted uplink repetition sequence, in accordance with some aspects of the present disclosure. The example 800 includes a first SPS PDSCH 602, a PDCCH 604, and a DG PDSCH 606. The example 600 illustrates a first set of uplink channel transmission repetitions that includes uplink repetitions 610, 612, 614, 616. The UE can determine that uplink repetition 612 overlaps with at least a portion of the DG PDSCH 606. Consequently, the sequence comprised of uplink repetitions 612, 614, 616 is dropped due to the one overlapping repetition (e.g., 612).

In some aspects, the dropped uplink repetition sequence may be delayed and retransmitted at a later time based on a K1 parameter configuration. In some aspects, the user equipment can receive, from the base station over a downlink channel through SPS signaling (e.g., RRC signaling), control information indicating a predetermined repetition pattern and a plurality of K1 parameter values associated with a downlink data transmission (e.g., DG PDSCH 606). In some aspects, each of the plurality of K1 parameter values includes a different time offset between a downlink data transmission and an associated uplink transmission. The user equipment may select a first K1 parameter value from the plurality of K1 parameter values that provides a number of repetition occasions with valid uplink resources for a number of total repetitions in the second set of uplink channel transmission repetitions. For example, for each SPS PDSCH (e.g., SPS PDSCH 602), the user equipment can select the first K1 parameter value that results in valid PUCCH resources for all uplink repetitions. As illustrated in FIG. 6, the K1 parameter value is 4 without any dropped uplinked repetition. In some aspects, the user equipment can delay transmission of the second set of uplink channel transmission repetitions (e.g., uplink repetitions 620, 622, 624, 626) to a starting repetition occasion of the number of repetition occasions based on the first K1 parameter value. In some aspects, each uplink channel transmission repetition in the second set of uplink channel transmission repetitions can have one or more of a same time location or same frequency location with a respective repetition occasion based on the predetermined repetition pattern.

Figure 7:
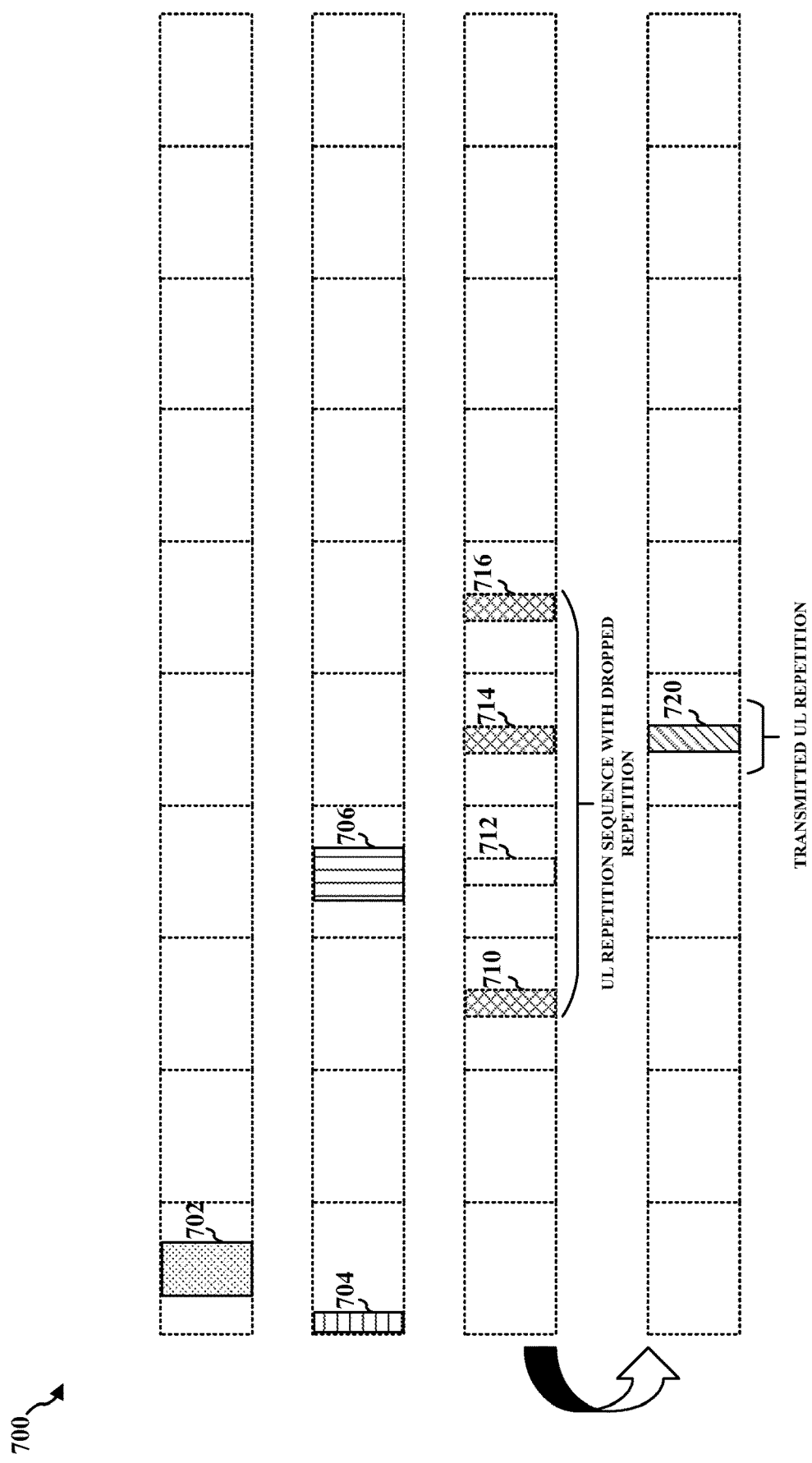
FIG. 7 is a diagram illustrating an example of a single transmitted uplink repetition, in accordance with some aspects of the present disclosure.

FIG. 7 is a diagram illustrating an example 700 of a single transmitted uplink repetition, in accordance with some aspects of the present disclosure. The example 700 includes a first SPS PDSCH 702, a PDCCH 704, and a DG PDSCH 706. The example 700 illustrates a first set of uplink channel transmission repetitions that includes uplink repetitions 710, 712, 714, 716. The UE can determine that uplink repetition 712 overlaps with at least a portion of the DG PDSCH 706. Consequently, the uplink repetition 712 may be dropped, while the remaining uplink repetitions 710, 714 and 716 remain active and non-overlapping with the DG PDSCH 706. In other aspects, the sequence of uplink repetitions 710, 712, 714 and 716 may be dropped as a whole due to the overlapped uplink repetition 712.

In some examples, the uplink repetition 712 may be represented as part of a first subset and the uplink repetitions 710, 714 and 716 may be represented as part of a second subset, where the uplink repetitions 710-716 may be represented as a first set of uplink channel transmission repetitions. In some aspects, a second set of uplink channel transmission repetitions (including the first subset and excluding the second subset) may be transmitted with a same number of dropped repetitions as the first subset of the first set of uplink channel transmission repetitions. As illustrated in FIG. 7, uplink repetition 720 is transmitted based on its correspondence to a single dropped uplink repetition (e.g., 712) among the uplink repetitions 710-716.

Figure 8:
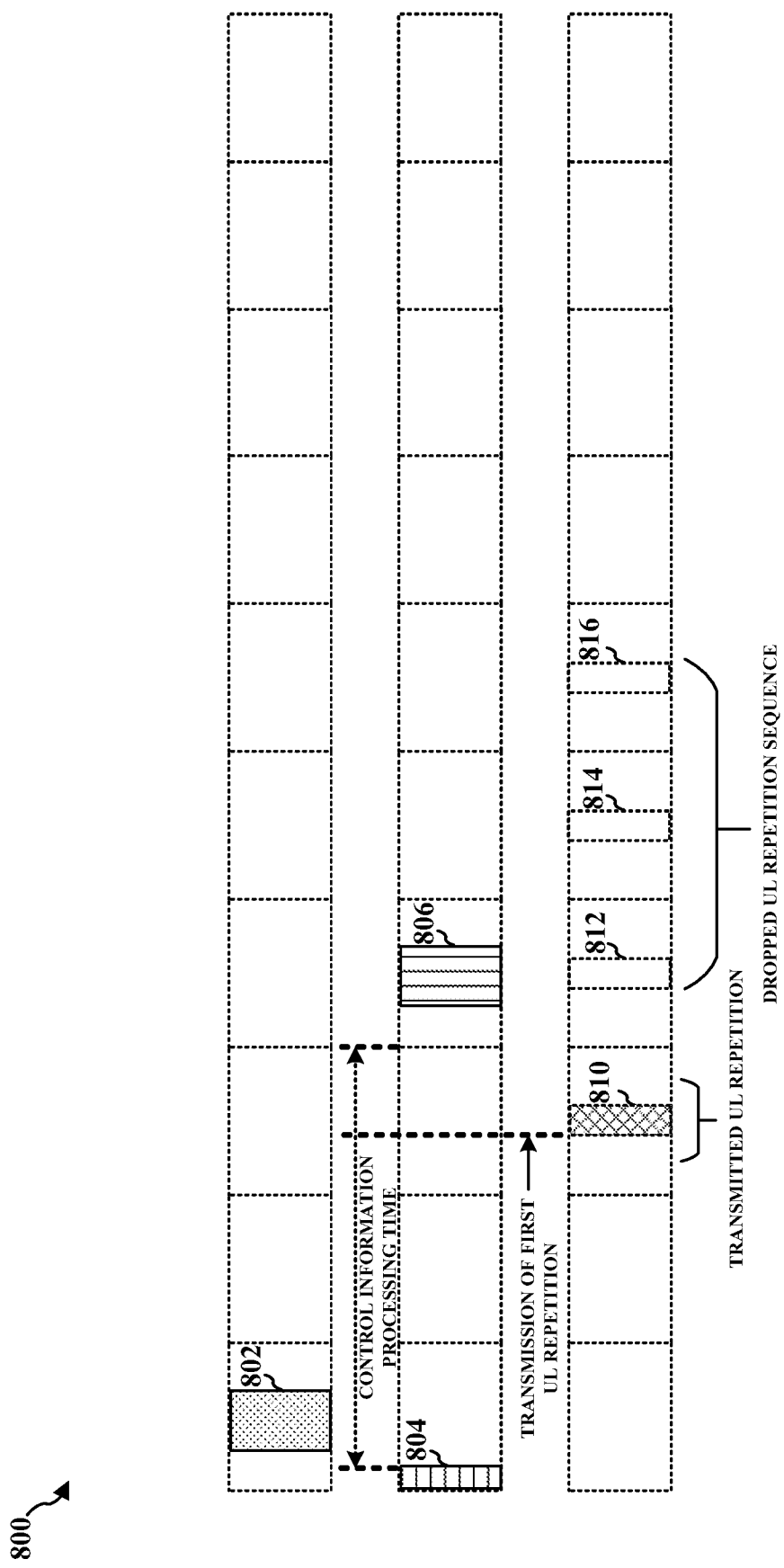
FIG. 8 is a diagram illustrating an example of a single transmitted uplink repetition in view of a processing time, in accordance with some aspects of the present disclosure.

FIG. 8 is a diagram illustrating an example 800 of a single transmitted uplink repetition in view of a processing time, in accordance with some aspects of the present disclosure. The example 800 includes a first SPS PDSCH 802, a PDCCH 804, and a DG PDSCH 806. The example 800 illustrates a first set of uplink channel transmission repetitions that includes uplink repetitions 810, 812, 814, 816. The UE can determine that uplink repetition 812 overlaps with at least a portion of the DG PDSCH 806. Consequently, the sequence comprised of uplink repetitions 812, 814, 816 is dropped due to the one overlapping repetition (e.g., 812). In a use case for retransmission of a dropped SPS A/N based on an UE-based implicit rule, a UE-based determination on whether to retransmit SPS A/N with at least one original uplink repetition dropped for a PUCCH repetition may be performed. In some aspects, the SPS A/N is not retransmitted if any uplink repetition of the original PUCCH repetition has been transmitted. For example, due to the UE processing timeline for the UE to decode DG scheduling (e.g., DCI scheduling) overlapped with a 2nd PUCCH repetition after a 1st repetition has been transmitted.

As illustrated in FIG. 8, the user equipment can receive, from a base station over a downlink channel, the first SPS PDSCH 802 (associated with the uplink repetitions) at a first time, the PDCCH 804 associated with the DG PDSCH 806 at a second time, and the DG PDSCH 806 at a third time. In some aspects, the user equipment can transmit, to the base station over an uplink channel, a first uplink repetition 810 of the second set of uplink channel transmission repetitions (e.g., uplink repetitions 810, 812, 814, 816) at a fourth time prior to the third time in response to the SPS PDSCH 802. In some aspects, the second time and the fourth time are separated by a timeline. In some aspects, the user equipment can determine whether a processing time to decode the control information exceeds the timeline. In some aspects, the user equipment can refrain from transmitting the first subset and the second subset of the second set of uplink channel transmission repetitions when the processing time exceeds the timeline. As illustrated in FIG. 8, the uplink repetitions 812, 814, 816 due to the uplink repetition 810 having been transmitted prior to completion of the processing time to decode the PDCCH 804.

Figure 9:
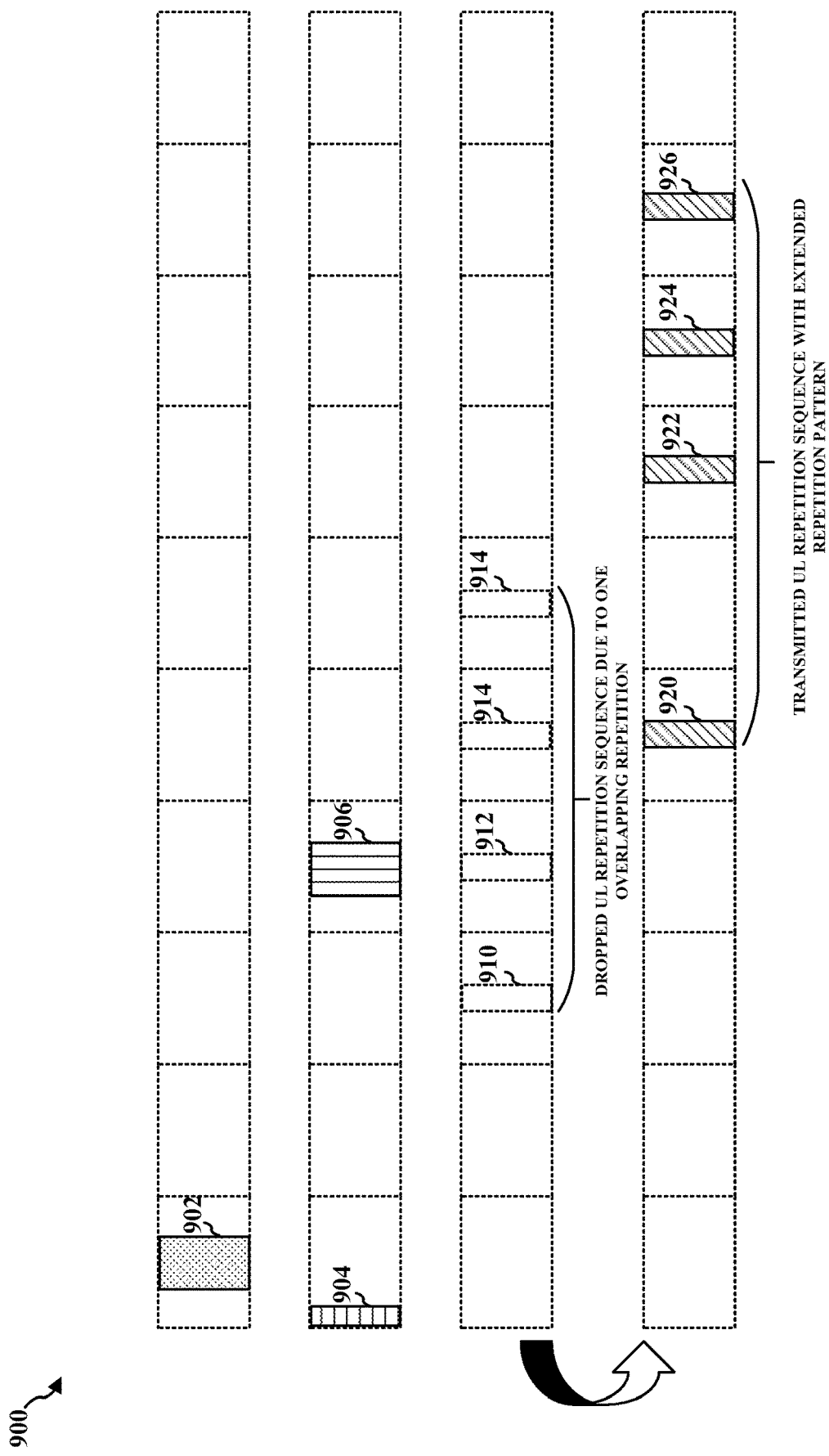
FIG. 9 is a diagram illustrating an example of a transmitted uplink repetition sequence with extended repetition pattern, in accordance with some aspects of the present disclosure.

FIG. 9 is a diagram illustrating an example 900 of a transmitted uplink repetition sequence with extended repetition pattern, in accordance with some aspects of the present disclosure. The example 900 includes a first SPS PDSCH 902, a first PDCCH 904, and a DG PDSCH 906. The example 900 illustrates a first set of uplink channel transmission repetitions that includes uplink repetitions 910, 912, 914, 916. The UE can determine that uplink repetition 912 overlaps with at least a portion of the DG PDSCH 906. Consequently, the sequence comprised of uplink repetitions 910, 912, 914, 916 is dropped due to the one overlapping repetition (e.g., 912).

In some aspects, the user equipment can receive, from the base station over a downlink channel, control information indicating a resource allocation. In some aspects, the user equipment can determine a number of uplink repetition occasions corresponding to a number of dropped repetitions in the first subset are available to accommodate the number of dropped repetitions in the first subset based on the resource allocation. In some aspects, the second set of uplink channel transmission repetitions is transmitted with a first number of repetition occasions greater than a second number of repetition occasions used in the first set of uplink channel transmission repetitions. As illustrated in FIG. 9, the first set of uplink channel transmission repetitions (e.g., uplink repetitions 910, 912, 914, 916) includes four repetition occasions, while the second set of uplink channel transmission repetitions (e.g., 920, 922, 924, 926) includes at least five repetitions occasions.

In a use case for retransmission of a dropped SPS A/N based on an UE-based implicit rule, if SPS A/N with at least one original uplink repetition dropped is determined to be retransmitted, the retransmitted SPS A/N in a PUCCH repetition may further extend the original repetition number until one or more uplink repetition occasions become available to accommodate the retransmitted uplink repetition number. For example, if the original repetition number is 4 and the $2^{nd}$ and $3^{rd}$ uplink repetitions are dropped, the user equipment may extend the original uplink repetition number based on the original uplink repetition pattern until two repetition occasions are available to accommodate the two retransmitted uplink repetitions, which may not need to be in adjacent occasions.

Figure 10:
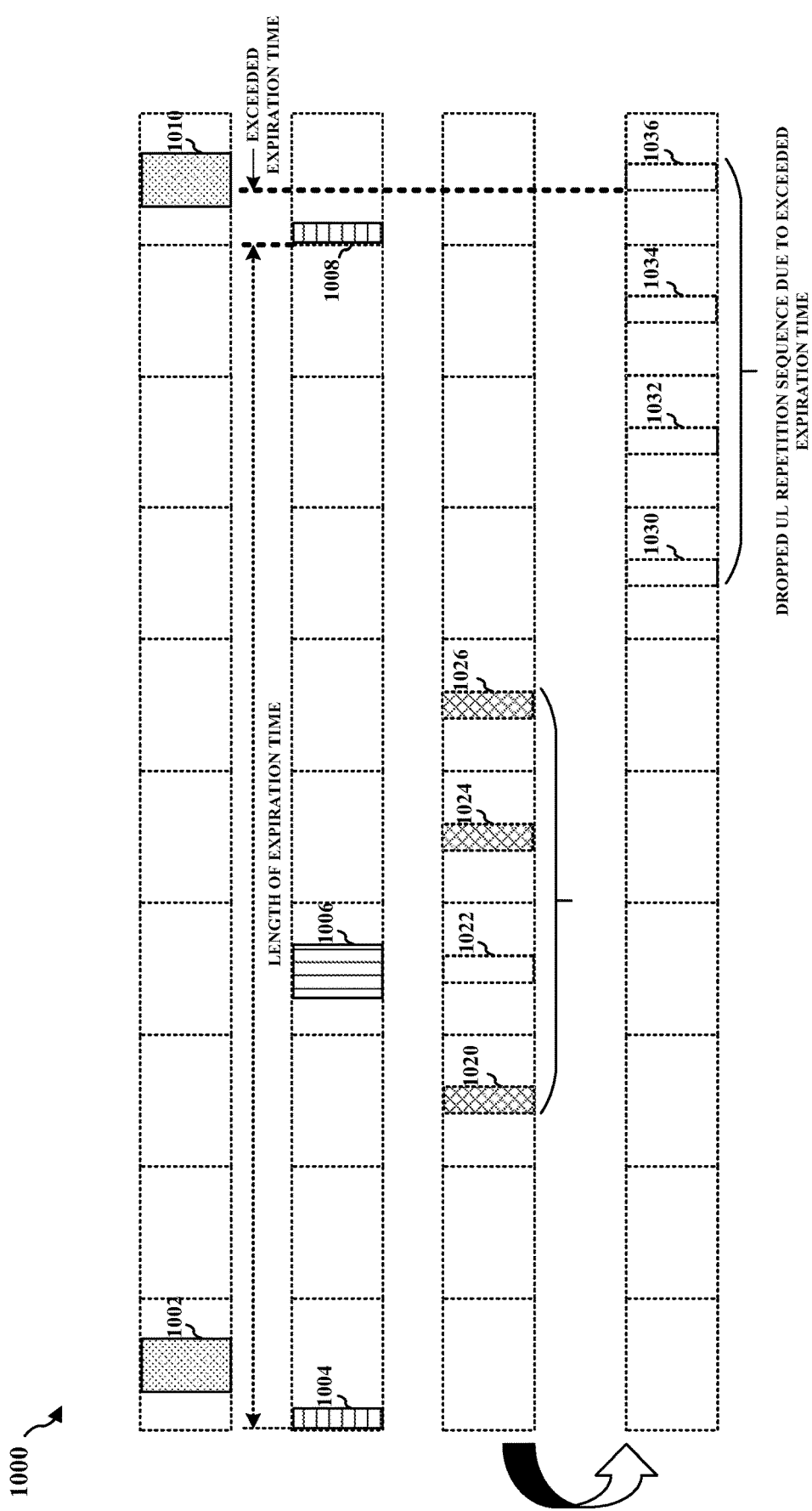
FIG. 10 is a diagram illustrating an example of a dropped uplink repetition sequence in view of an expiration time, in accordance with some aspects of the present disclosure.

FIG. 10 is a diagram illustrating an example 1000 of a dropped uplink repetition sequence in view of an expiration time, in accordance with some aspects of the present disclosure. The example 1000 includes a first SPS PDSCH 1002, a first PDCCH 1004, a DG PDSCH 1006, a second PDCCH 1008 and a second SPS PDSCH 1010. The example 1000 illustrates a first set of uplink channel transmission repetitions that includes uplink repetitions 1020, 1022, 1024, 1026. The UE can determine that uplink repetition 1022 overlaps with at least a portion of the DG PDSCH 1006. In some aspects, the UE may be configured to transmit an uplink repetition such that any retransmitted uplink repetition may not occur later than an expiration time, e.g. before the start of next SPS occasion. For example, the length of the expiration time may extend from a first SPS occasion (e.g., at start of PDCCH 1004) to a second SPS occasion (e.g., at start of PDCCH 1008).

In some aspects, the user equipment can determine whether one or more uplink channel transmission repetitions in the second set of uplink channel transmission repetitions are scheduled to occur prior to a predetermined expiration time. In some aspects, the user equipment can determine that one or more uplink channel transmission repetitions in the second set of uplink channel transmission repetitions (e.g., uplink repetitions 1030, 1032, 1034, 1036) are scheduled not to occur prior to the predetermined expiration time. Consequently, the uplink repetition sequence is dropped due to the expiration time having been exceeded. In this regard, the user equipment can refrain from transmitting the uplink channel transmission repetitions 1030, 1032, 1034, 1036 that includes the uplink repetition 1036 scheduled not to occur prior to the predetermined expiration time.

Figure 11:
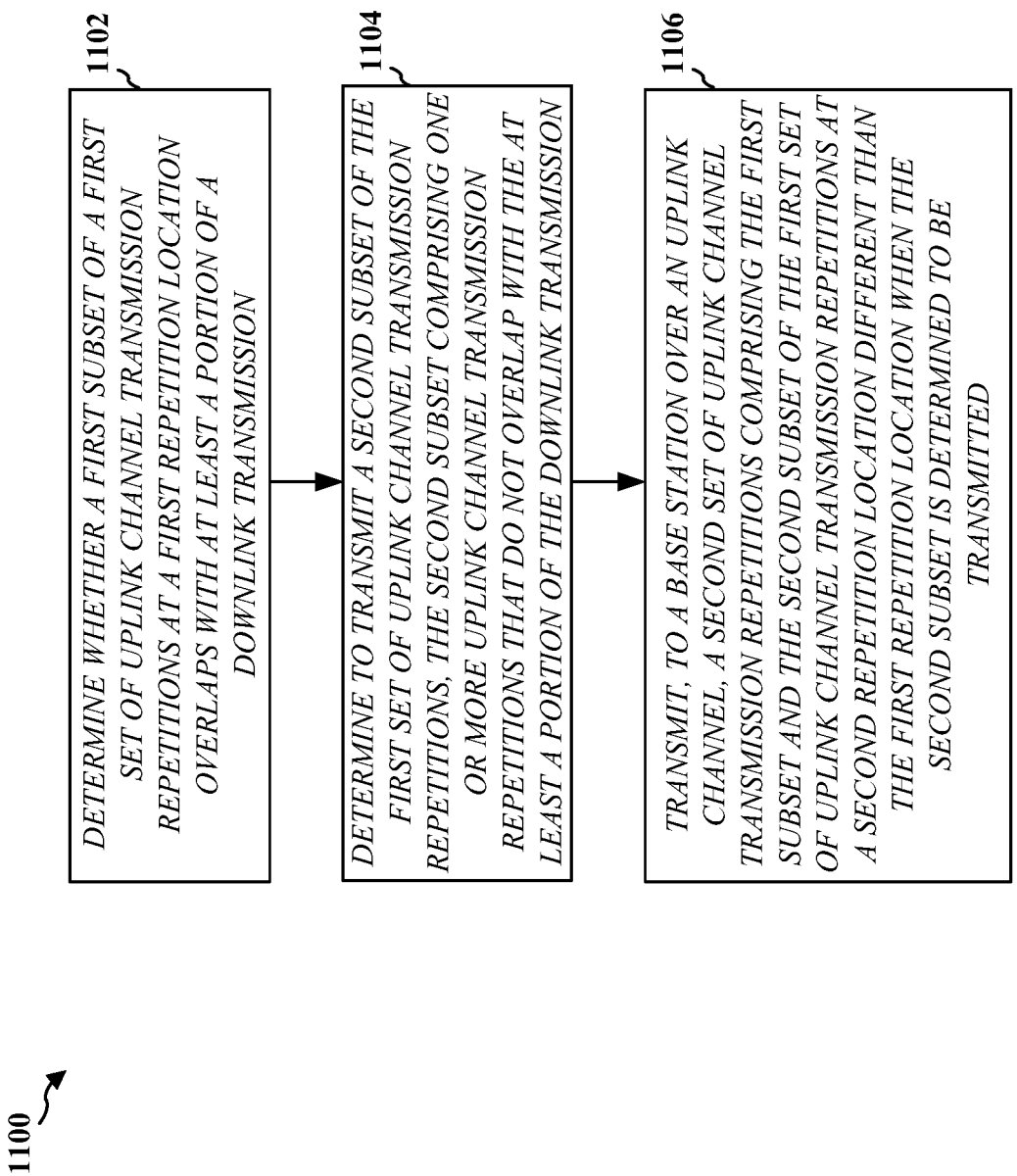
FIG. 11 is a flowchart of a process of wireless communication for retransmission of overlapped uplink channel transmission repetitions at a user equipment, in accordance with some aspects of the present disclosure.

FIG. 11 is a flowchart of a process 1100 of wireless communication for multiplexing of overlapped uplink channel transmission repetitions at a user equipment, in accordance with some aspects of the present disclosure. The process 1100 may be performed by a user equipment (e.g., the UE 104; UE 350, the RSU 107). As illustrated, the process 1100 includes a number of enumerated steps, but embodiments of the process 1100 may include additional steps before, after, and in between the enumerated steps. In some embodiments, one or more of the enumerated steps may be omitted or performed in a different order.

At 1102, the user equipment may determine whether a first subset of a first set of uplink channel transmission repetitions overlaps with at least a portion of a downlink transmission. The user equipment can determine whether the first subset is overlapped, e.g., as described in connection with FIGS. 1-6. For instance, 1102 may be performed by one or more components described with respect to FIG. 3, e.g., controller/processor 359, receive processor 356, transmit processor 368, receiver/transmitter 354 and/or antenna 352. The first subset of a first set of uplink channel transmission repetitions of whether it overlaps with at least a portion of a downlink transmission may be determined, e.g., by the determination component 1340 of the apparatus 1302 in FIG. 13.

At 1104, the user equipment may determine whether to transmit a second subset of the first set of uplink channel transmission repetitions when the first subset overlaps with the at least a portion of the downlink transmission, the second subset comprising one or more uplink channel transmission repetitions that do not overlap with the downlink transmission. The user equipment can determine whether to transmit the second subset, e.g., as described in connection with FIGS. 1-6. For instance, 1104 may be performed by one or more components described with respect to FIG. 3, e.g., controller/processor 359, transmit processor 368, receiver/transmitter 354 and/or antenna 352. The second subset of the first set of uplink channel transmission repetitions of whether to transmit when the first subset overlaps with the at least a portion of the downlink transmission may be determined, e.g., by the determination component 1340 and/or the uplink repetition retransmission component 1342 of the apparatus 1302 in FIG. 13.

At 1106, the user equipment may transmit, to a base station over an uplink channel, a second set of uplink channel transmission repetitions comprising the first subset and the second subset of the first set of uplink channel transmission repetitions when the second subset is determined to be transmitted. In some aspects, the second set of uplink channel transmission repetitions does not overlap with the downlink transmission. The user equipment can transmit the second set of uplink channel transmission repetitions, e.g., as described in connection with FIGS. 1-6. For instance, 1106 may be performed by one or more components described with respect to FIG. 3, e.g., controller/processor 359, transmit processor 368, receiver/transmitter 354 and/or antenna 352. The second set of uplink channel transmission repetitions comprising the first subset and the second subset of the first set of uplink channel transmission repetitions may be transmitted, e.g., by the determination component 1340 and/or the uplink repetition retransmission component 1342 via the transmission component 1334 of the apparatus 1302 in FIG. 13.

In some aspects, the user equipment can receive, from the base station over a downlink channel, a configuration indicating a request to retransmit one or more uplink channel transmission repetitions that overlap with the at least a portion of the downlink transmission. In some aspects, the user equipment can transmit, to the base station over an uplink channel, the second set of uplink channel transmission repetitions with the first subset based on the configuration, wherein the second set of uplink channel transmission repetitions excludes the second subset when the second subset is determined not to be transmitted.

In some aspects, the user equipment can receive, from the base station over a downlink channel, a configuration indicating a request to retransmit one or more uplink channel transmission repetitions that overlap with the at least a portion of the downlink transmission and transmit one or more uplink channel transmission repetitions that do not overlap with the downlink transmission. In some aspects, the user equipment can determine whether to transmit the second subset by determining that the second subset is to be transmitted based on the configuration.

In some aspects, the user equipment can determine that the first subset includes a number of dropped repetitions. The user equipment can determine whether the number of dropped repetitions exceeds a number threshold. In some aspects, the user equipment can refrain from transmitting the first subset and the second subset of the first set of uplink channel transmission repetitions when the number of dropped repetitions does not exceed the number threshold. In some aspects, the user equipment can transmit the second set of uplink channel transmission repetitions by transmitting, to the base station over the uplink channel, the second set of uplink channel transmission repetitions with the first subset and the second subset when the number of dropped repetitions exceeds the number threshold. In some aspects, the user equipment can receive, from the base station over a downlink channel through semi-static or dynamic signaling, a configuration indicating the number threshold.

In some aspects, the user equipment can determine that the first set of uplink channel transmission repetitions includes a number of total repetitions. The user equipment can determine that the first subset includes a number of dropped repetitions. In some aspects, the user equipment may determine a percentage of dropped repetitions based on the number of dropped repetitions and the number of total repetitions. The user equipment can determine whether the percentage of dropped repetitions exceeds a percentage threshold. In some aspects, the user equipment refrains from transmitting the first subset and the second subset of the first set of uplink channel transmission repetitions when the percentage of dropped repetitions does not exceed the percentage threshold. In some aspects, the user equipment can transmit the second set of uplink channel transmission repetitions by transmitting, to the base station over the uplink channel, the second set of uplink channel transmission repetitions with the first subset and the second subset when the percentage of dropped repetitions exceeds the percentage threshold. In some aspects, the user equipment can receive, from the base station over a downlink channel through semi-static or dynamic signaling, a configuration indicating the percentage threshold.

In some aspects, the user equipment can receive, from the base station over a downlink channel, control information indicating a first PHY priority or a second PHY priority associated with the first set of uplink channel transmission repetitions. In some aspects, the first PHY priority is greater (e.g., higher priority) than the second PHY priority (e.g., low priority). In some aspects, the user equipment can determine that the first set of uplink channel transmission repetitions is allocated with first resources that do not overlap with second resources of the downlink transmission based on the control information when the first set of uplink channel transmission repetitions is associated with the first PHY priority. In some aspects, the user equipment can determine whether the first subset of the first set of uplink channel transmission repetitions overlaps with the at least a portion of the downlink transmission by determining that the first set of uplink channel transmission repetitions is allocated with first resources that overlap with at least a portion of second resources of the downlink transmission based on the control information when the first set of uplink channel transmission repetitions is associated with the second PHY priority.

In some aspects, the user equipment can receive, from a base station over a downlink channel, a first data transmission associated with the first set of uplink channel transmission repetitions at a first time, control information associated with the downlink transmission at a second time, and the downlink transmission at a third time. In some aspects, the downlink transmission includes a second data transmission. In some aspects, the user equipment can transmit, to the base station over an uplink channel, a first uplink channel transmission repetition of the second set of uplink channel transmission repetitions at a fourth time prior to the third time in response to the first data transmission. In some aspects, the second time and the fourth time are separated by a timeline. In some aspects, the user equipment can determine whether a processing time to decode the control information exceeds the timeline. In some aspects, the user equipment can refrain from transmitting the first subset and the second subset of the second set of uplink channel transmission repetitions when the processing time exceeds the timeline.

In some aspects, the second set of uplink channel transmission repetitions (including the first subset and the second subset) is transmitted with a same number of total repetitions as the first set of uplink channel transmission repetitions.

In some aspects, the second set of uplink channel transmission repetitions (including the first subset and excluding the second subset) is transmitted with a same number of dropped repetitions as the first subset of the first set of uplink channel transmission repetitions.

In some aspects, the user equipment can receive, from the base station over a downlink channel, control information indicating a resource allocation. In some aspects, the user equipment can determine a number of uplink repetition occasions corresponding to a number of dropped repetitions in the first subset are available to accommodate the number of dropped repetitions in the first subset based on the resource allocation. In some aspects, the second set of uplink channel transmission repetitions is transmitted with a first number of repetition occasions greater than a second number of repetition occasions used in the first set of uplink channel transmission repetitions. In some aspects, the first number of repetition occasions includes uplink channel transmission repetitions on non-consecutive occasions of the first number of repetition occasions.

In some aspects, the second set of uplink channel transmission repetitions is transmitted with a same repetition pattern as the first set of uplink channel transmission repetitions. In some aspects, the second set of uplink channel transmission repetitions is transmitted with uplink channel transmission repetitions separated by a same interval between two adjacent repetitions as the first set of uplink channel transmission repetitions.

In other aspects, the second set of uplink channel transmission repetitions is transmitted with a different repetition pattern than the first set of uplink channel transmission repetitions. In some aspects, the second set of uplink channel transmission repetitions is transmitted with uplink channel transmission repetitions separated by a different interval between two adjacent repetitions than the first set of uplink channel transmission repetitions.

In some aspects, the user equipment can receive, from the base station over a downlink channel, control information indicating a resource allocation, a predetermined repetition pattern and a starting location per repetition occasion for the second set of uplink channel transmission repetitions. In some aspects, the user equipment can transmit the second set of uplink channel transmission repetitions with the first subset and the second subset by delaying transmission of the second set of uplink channel transmission repetitions to a starting repetition occasion based on the resource allocation. In some aspects, the starting repetition occasion includes one or more first available uplink symbols that correspond to a configured uplink physical channel resource. In other aspects, the user equipment can delay each uplink channel transmission repetition in the second set of uplink channel transmission repetitions to a designated location within each repetition occasion for a number of repetition occasions corresponding to a number of total repetitions in the second set of uplink channel transmission repetitions. In some aspects, each uplink channel transmission repetition in the second set of uplink channel transmission repetitions has one or more of a same time location or same frequency location with a respective repetition occasion based on the predetermined repetition pattern.

In some aspects, the user equipment can receive, from the base station over a downlink channel through SPS signaling, control information indicating a predetermined repetition pattern and a plurality of K1 parameter values associated with a downlink data transmission. In some aspects, each of the plurality of K1 parameter values includes a different time offset between a downlink data transmission and an associated uplink transmission. In some aspects, the user equipment can select a first K1 parameter value from the plurality of K1 parameter values that provides a number of repetition occasions with valid uplink resources for a number of total repetitions in the second set of uplink channel transmission repetitions. The user equipment can delay transmission of the second set of uplink channel transmission repetitions to a starting repetition occasion of the number of repetition occasions based on the first K1 parameter value. In some aspects, each uplink channel transmission repetition in the second set of uplink channel transmission repetitions has one or more of a same time location or same frequency location with a respective repetition occasion based on the predetermined repetition pattern.

In some aspects, the user equipment can receive, from the base station over a downlink channel, control information indicating a predetermined repetition pattern and a resource allocation. In some aspects, the user equipment can determine a first available repetition occasion for each uplink channel transmission repetition in the second set of uplink channel transmission repetitions from a number of repetitions occasions indicated in the resource allocation. In some aspects, each interval between two adjacent repetitions of the second set of uplink channel transmission repetitions may not be lesser than an interval included in the predetermined repetition pattern.

In some aspects, the user equipment can determine whether one or more uplink channel transmission repetitions in the second set of uplink channel transmission repetitions are scheduled to occur prior to a predetermined expiration time. In some aspects, the user equipment can determine that one or more uplink channel transmission repetitions in the second set of uplink channel transmission repetitions are scheduled not to occur prior to the predetermined expiration time. In some aspects, the user equipment can refrain from transmitting the one or more uplink channel transmission repetitions in the second set of uplink channel transmission repetitions that are scheduled not to occur prior to the predetermined expiration time.

In some aspects, the user equipment can determine whether one or more uplink channel transmission repetitions in the second set of uplink channel transmission repetitions overlap with one or more uplink channel transmission repetitions of the first set of uplink channel transmission repetitions. The user equipment can select one or more uplink channel transmission repetitions from either the second set of uplink channel transmission repetitions or the first set of uplink channel transmission repetitions for transmission when the one or more uplink channel transmission repetitions of the second set of uplink channel transmission repetitions overlap with the one or more uplink channel transmission repetitions of the first set of uplink channel transmission repetitions.

In various aspects, the downlink transmission includes a dynamic grant (DG) PDSCH, and each of the second set of uplink channel transmission repetitions includes a SPS PUCCH repetition.

Figure 12:
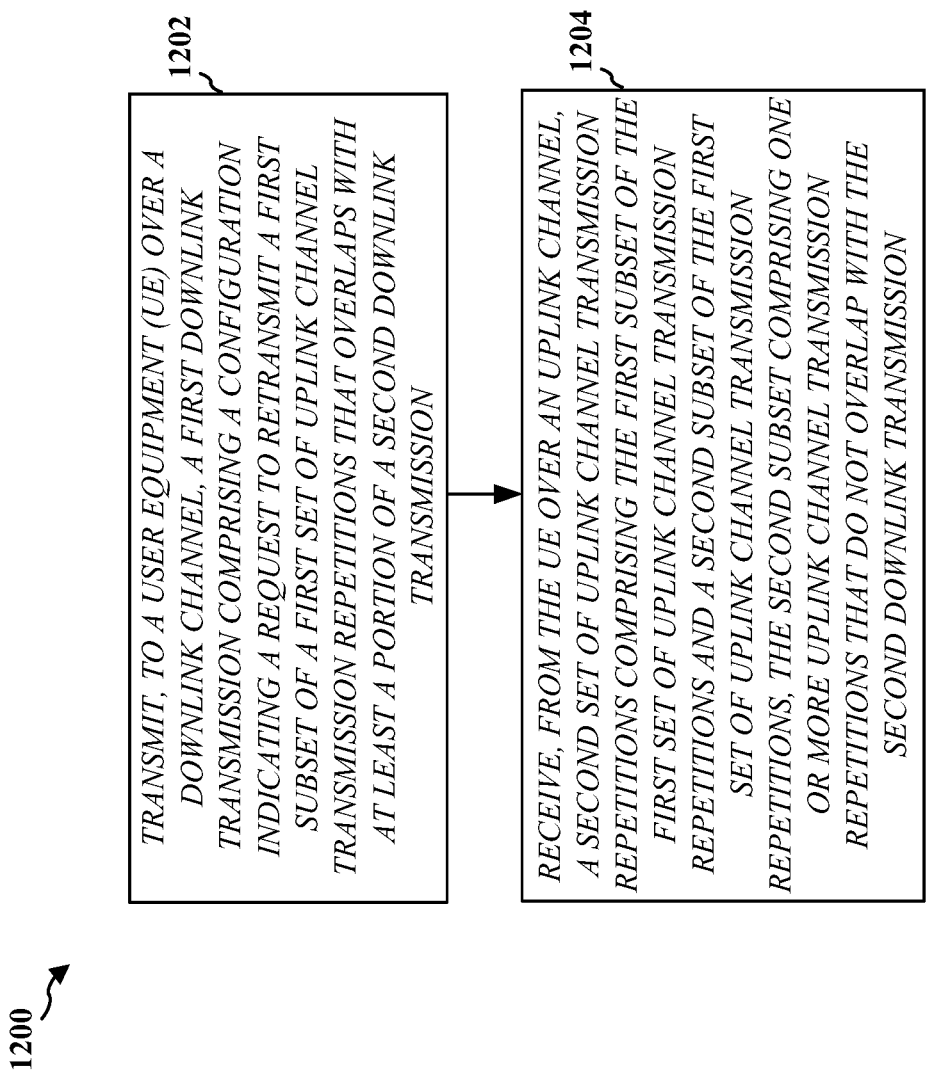
FIG. 12 is a flowchart of a process of wireless communication for retransmission of overlapped uplink channel transmission repetitions at a base station, in accordance with some aspects of the present disclosure.

FIG. 12 is a flowchart of a process 1200 of wireless communication for multiplexing of overlapped uplink channel transmission repetitions at a base station, in accordance with some aspects of the present disclosure. The process 1200 may be performed by a base station (e.g., the BS 102, 180; base station 310). As illustrated, the process 1200 includes a number of enumerated steps, but embodiments of the process 1200 may include additional steps before, after, and in between the enumerated steps. In some embodiments, one or more of the enumerated steps may be omitted or performed in a different order.

At 1202, the base station may transmit, to a UE over a downlink channel, a first downlink transmission comprising a configuration indicating a request to retransmit a first subset of a first set of uplink channel transmission repetitions that overlaps with at least a portion of a second downlink transmission. The base station can transmit the first downlink transmission, e.g., as described in connection with FIGS. 1-6. For instance, 1202 may be performed by one or more components described with respect to FIG. 3, e.g., controller/processor 375, transmit processor 316, receiver/transmitter 318 and/or antenna 320. The first downlink transmission may be transmitted, e.g., by the downlink transmission component 1440 via the transmission component 1434 of the apparatus 1402 in FIG. 14.

At 1204, the base station may receive, from the UE over an uplink channel, a second set of uplink channel transmission repetitions comprising the first subset of the first set of uplink channel transmission repetitions and a second subset of the first set of uplink channel transmission repetitions, the second subset comprising one or more uplink channel transmission repetitions that do not overlap with the second downlink transmission, wherein the second set of uplink channel transmission repetitions does not overlap with the second downlink transmission. The base station can receive the second set of uplink channel transmission repetitions, e.g., as described in connection with FIGS. 1-6. For instance, 1204 may be performed by one or more components described with respect to FIG. 3, e.g., controller/processor 375, receive processor 370, receiver/transmitter 318 and/or antenna 320. The second set of uplink channel transmission repetitions comprising the first subset of the first set of uplink channel transmission repetitions and the second subset of the first set of uplink channel transmission repetitions may be received, e.g., by the uplink repetition processing component 1442 via the reception component 1430 of the apparatus 1402 in FIG. 14.

In some aspects, the base station can transmit, to the UE over a downlink channel, a configuration indicating a request to retransmit one or more uplink channel transmission repetitions that overlap with the at least a portion of the second downlink transmission. In some aspects, the base station can receive, from the UE over an uplink channel, the second set of uplink channel transmission repetitions with the first subset based on the configuration, wherein the second set of uplink channel transmission repetitions excludes the second subset. For instance, the configuration transmission may be performed by one or more components described with respect to FIG. 3, e.g., controller/processor 375, transmit processor 316, receiver/transmitter 318 and/or antenna 320. The downlink configuration may be transmitted, e.g., by the configuration component 1444 via the transmission component 1434 of the apparatus 1402 in FIG. 14.

In some aspects, the base station can transmit, to the UE over a downlink channel, a configuration indicating a request to retransmit one or more uplink channel transmission repetitions that overlap with the at least a portion of the second downlink transmission and transmit one or more uplink channel transmission repetitions that do not overlap with the second downlink transmission. In some aspects, the base station can transmit, to the UE over a downlink channel through semi-static or dynamic signaling, a configuration indicating a number threshold, wherein the receiving the second set of uplink channel transmission repetitions comprises receiving, from the UE over the uplink channel, the second set of uplink channel transmission repetitions with the first subset and the second subset based on the number threshold. In some aspects, the base station can transmit, to the UE over a downlink channel through semi-static or dynamic signaling, a configuration indicating a percentage threshold, wherein the receiving the second set of uplink channel transmission repetitions comprises receiving, from the UE over the uplink channel, the second set of uplink channel transmission repetitions with the first subset and the second subset based on the percentage threshold. In some aspects, the base station can transmit, to the UE over a downlink channel, control information indicating a first physical layer (PHY) priority or a second PHY priority associated with the first set of uplink channel transmission repetitions, the first PHY priority being higher than the second PHY priority.

In some aspects, the second set of uplink channel transmission repetitions is received with a same number of total repetitions as the first set of uplink channel transmission repetitions. In some aspects, the second set of uplink channel transmission repetitions may include the first subset and excluding the second subset is received with a same number of dropped repetitions as the first subset of the first set of uplink channel transmission repetitions. In some aspects, the second set of uplink channel transmission repetitions is received with a first number of repetition occasions greater than a second number of repetition occasions used in the first set of uplink channel transmission repetitions. In some aspects, the first number of repetition occasions includes uplink channel transmission repetitions on non-consecutive occasions of the first number of repetition occasions.

In some aspects, the second set of uplink channel transmission repetitions is received with a same repetition pattern as the first set of uplink channel transmission repetitions. In some aspects, the second set of uplink channel transmission repetitions is received with uplink channel transmission repetitions separated by a same interval between two adjacent repetitions as the first set of uplink channel transmission repetitions. In some aspects, the second set of uplink channel transmission repetitions is received with a different repetition pattern than the first set of uplink channel transmission repetitions. In some aspects, the second set of uplink channel transmission repetitions is received with uplink channel transmission repetitions separated by a different interval between two adjacent repetitions than the first set of uplink channel transmission repetitions.

In some aspects, the base station can transmit, to the UE over a downlink channel, control information indicating a resource allocation, a predetermined repetition pattern and a starting location per repetition occasion for the second set of uplink channel transmission repetitions. In some aspects, the base station can receive a delayed transmission of the second set of uplink channel transmission repetitions at a starting repetition occasion based on the resource allocation. In some aspects, the base station can receive a delayed transmission of each uplink channel transmission repetition in the second set of uplink channel transmission repetitions at a designated location within each repetition occasion for a number of repetition occasions that corresponds to a number of total repetitions in the second set of uplink channel transmission repetitions, in which each uplink channel transmission repetition in the second set of uplink channel transmission repetitions has one or more of a same time location or same frequency location with a respective repetition occasion based on the predetermined repetition pattern.

In some aspects, the base station can transmit, to the UE over a downlink channel through semi-persistent scheduling (SPS) signaling, control information indicating a predetermined repetition pattern and a plurality of K1 parameter values associated with a downlink data transmission. In some aspects, the base station can receive a delayed transmission of the second set of uplink channel transmission repetitions at a starting repetition occasion of the number of repetition occasions based on a first K1 parameter value of the plurality of K1 parameter values, in which each uplink channel transmission repetition in the second set of uplink channel transmission repetitions has one or more of a same time location or same frequency location with a respective repetition occasion based on the predetermined repetition pattern. In some aspects, the base station can transmit, to the UE over a downlink channel, control information indicating a predetermined repetition pattern, in which each interval between two adjacent repetitions of the second set of uplink channel transmission repetitions is not lesser than an interval included in the predetermined repetition pattern.

Figure 13:
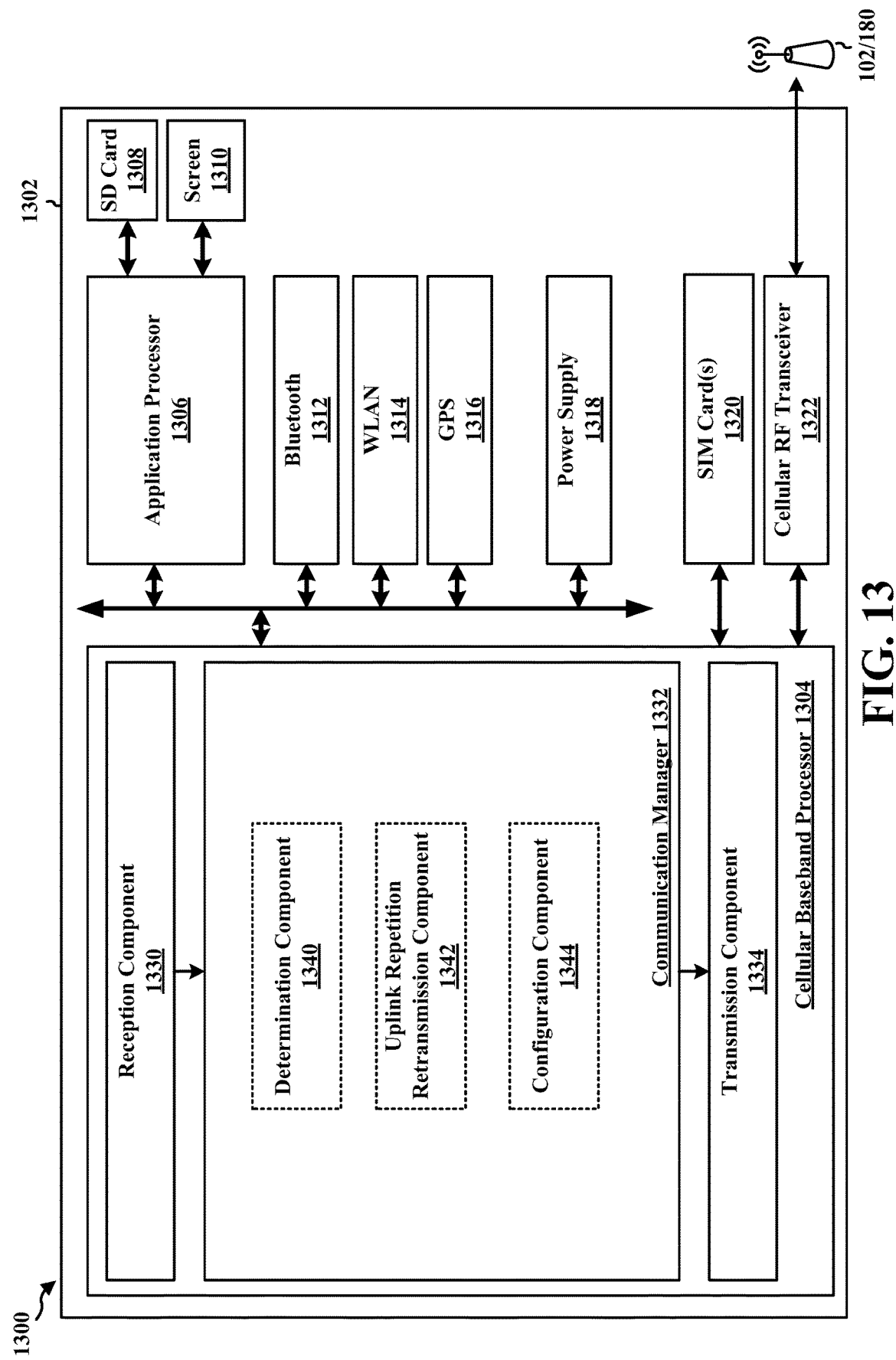
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software.

The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforementioned additional modules of the apparatus 1302.

The communication manager 1332 includes a determination component 1340, an uplink repetition retransmission component 1342 and a configuration component 1344. The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for determining whether a first subset of a first set of uplink channel transmission repetitions overlaps with at least a portion of a downlink transmission. The apparatus also includes means for determining whether to transmit a second subset of the first set of uplink channel transmission repetitions when the first subset overlaps with the at least a portion of the downlink transmission, in which the second subset comprises one or more uplink channel transmission repetitions that do not overlap with the downlink transmission. The apparatus also includes means for transmitting, to a base station over an uplink channel, a second set of uplink channel transmission repetitions comprising the first subset and the second subset of the first set of uplink channel transmission repetitions when the second subset is determined to be transmitted, in which the second set of uplink channel transmission repetitions does not overlap with the downlink transmission.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
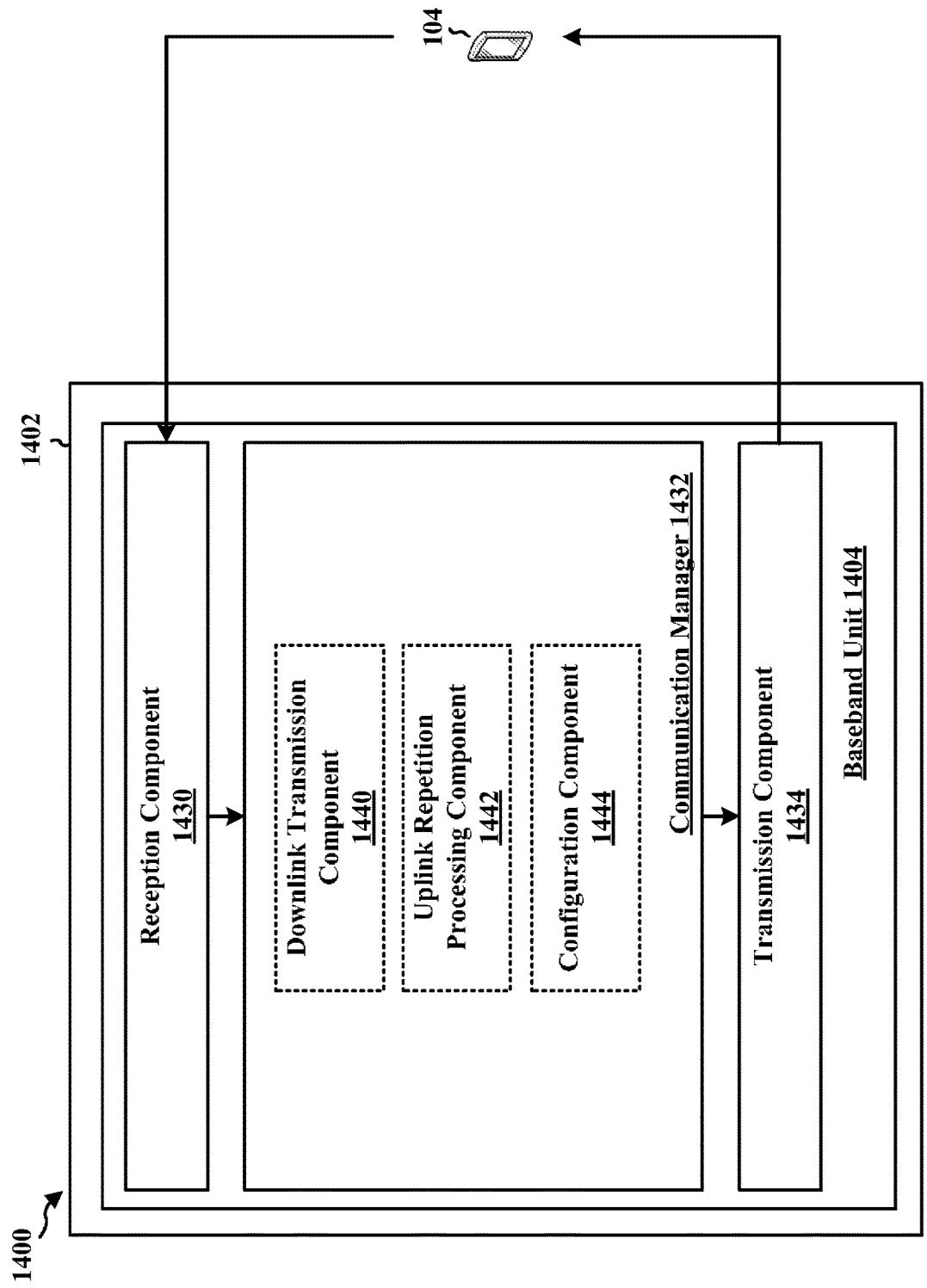
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a downlink transmission component 1440, an uplink repetition processing component 1442 and a configuration component 1444. The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for transmitting, to a user equipment (UE) over a downlink channel, a first downlink transmission comprising a configuration indicating a request to retransmit a first subset of a first set of uplink channel transmission repetitions that overlaps with at least a portion of a second downlink transmission. The apparatus also includes means for receiving, from the UE over an uplink channel, a second set of uplink channel transmission repetitions comprising the first subset of the first set of uplink channel transmission repetitions and a second subset of the first set of uplink channel transmission repetitions, the second subset comprising one or more uplink channel transmission repetitions that do not overlap with the second downlink transmission, in which the second set of uplink channel transmission repetitions does not overlap with the second downlink transmission.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following clauses are illustrative only and may be combined with aspects of other embodiments or teachings described herein, without limitation.

Clause 1 is a method of wireless communication at a user equipment that includes determining whether a first subset of a first set of uplink channel transmission repetitions overlaps with at least a portion of a downlink transmission; determining whether to transmit a second subset of the first set of uplink channel transmission repetitions when the first subset overlaps with the at least a portion of the downlink transmission, the second subset comprising one or more uplink channel transmission repetitions that do not overlap with the downlink transmission; and transmitting, to a base station over an uplink channel, a second set of uplink channel transmission repetitions comprising the first subset and the second subset of the first set of uplink channel transmission repetitions when the second subset is determined to be transmitted, wherein the second set of uplink channel transmission repetitions does not overlap with the downlink transmission.

In Clause 2, the method of clause 1 includes receiving, from the base station over a downlink channel, a configuration indicating a request to retransmit one or more uplink channel transmission repetitions of the first set that overlap with the at least a portion of the downlink transmission.

In Clause 3, the method of clause 1 or clause 2 includes transmitting, to the base station over an uplink channel, the second set of uplink channel transmission repetitions including the first subset based on the configuration, wherein the second set of uplink channel transmission repetitions excludes the second subset when the second subset is determined not to be transmitted based on the configuration.

In Clause 4, the method of any of clauses 1-3 includes receiving, from the base station over a downlink channel, a configuration indicating a request to retransmit one or more uplink channel transmission repetitions that overlap with the at least a portion of the downlink transmission and transmit one or more uplink channel transmission repetitions that do not overlap with the downlink transmission.

In Clause 5, the method of any of clauses 1-4 includes that the determining whether to transmit the second subset comprises determining that the second subset is to be transmitted based on the configuration.

In Clause 6, the method of any of clauses 1-5 includes determining that the first subset includes a number of dropped repetitions; determining whether the number of dropped repetitions exceeds a number threshold; refraining from transmitting the first subset and the second subset of the first set of uplink channel transmission repetitions when the number of dropped repetitions does not exceed the number threshold, wherein the transmitting the second set of uplink channel transmission repetitions comprises transmitting, to the base station over the uplink channel, the second set of uplink channel transmission repetitions with the first subset and the second subset when the number of dropped repetitions exceeds the number threshold.

In Clause 7, the method of any of clauses 1-6 includes receiving, from the base station over a downlink channel through semi-static or dynamic signaling, a configuration indicating the number threshold.

In Clause 8, the method of any of clauses 1-7 includes determining that the first set of uplink channel transmission repetitions includes a number of total repetitions; determining that the first subset includes a number of dropped repetitions; determining a percentage of dropped repetitions based on the number of dropped repetitions and the number of total repetitions; determining whether the percentage of dropped repetitions exceeds a percentage threshold; and refraining from transmitting the first subset and the second subset of the first set of uplink channel transmission repetitions when the percentage of dropped repetitions does not exceed the percentage threshold, wherein the transmitting the second set of uplink channel transmission repetitions comprises transmitting, to the base station over the uplink channel, the second set of uplink channel transmission repetitions with the first subset and the second subset when the percentage of dropped repetitions exceeds the percentage threshold.

In Clause 9, the method of any of clauses 1-8 includes receiving, from the base station over a downlink channel through semi-static or dynamic signaling, a configuration indicating the percentage threshold.

In Clause 10, the method of any of clauses 1-9 includes receiving, from the base station over a downlink channel, control information indicating a first physical layer (PHY) priority or a second PHY priority associated with the first set of uplink channel transmission repetitions, the first PHY priority being higher than the second PHY priority; and determining that the first set of uplink channel transmission repetitions is allocated with first resources that do not overlap with second resources of the downlink transmission based on the control information when the first set of uplink channel transmission repetitions is associated with the first PHY priority, wherein the determining whether the first subset of the first set of uplink channel transmission repetitions overlaps with the at least a portion of the downlink transmission comprises determining that the first set of uplink channel transmission repetitions is allocated with first resources that overlap with at least a portion of second resources of the downlink transmission based on the control information when the first set of uplink channel transmission repetitions is associated with the second PHY priority.

In Clause 11, the method of any of clauses 1-10 includes receiving, from a base station over a downlink channel, a first data transmission associated with the first set of uplink channel transmission repetitions at a first time, control information associated with the downlink transmission at a second time, and the downlink transmission at a third time, wherein the downlink transmission comprises a second data transmission; transmitting, to the base station over an uplink channel, a first uplink channel transmission repetition of the second set of uplink channel transmission repetitions at a fourth time prior to the third time in response to the first data transmission, wherein the second time and the fourth time are separated by a timeline; determining whether a processing time to decode the control information exceeds the timeline; and refraining from transmitting the first subset and the second subset of the second set of uplink channel transmission repetitions when the processing time exceeds the timeline.

In Clause 12, the method of any of clauses 1-11 includes that the second set of uplink channel transmission repetitions comprising the first subset and the second subset is transmitted with a same number of total repetitions as the first set of uplink channel transmission repetitions.

In Clause 13, the method of any of clauses 1-12 includes that the second set of uplink channel transmission repetitions comprising the first subset and excluding the second subset is transmitted with a same number of dropped repetitions as the first subset of the first set of uplink channel transmission repetitions.

In Clause 14, the method of any of clauses 1-13 includes receiving, from the base station over a downlink channel, control information indicating a resource allocation; and determining that a number of uplink repetition occasions corresponding to a number of dropped repetitions in the first subset are available to accommodate the number of dropped repetitions in the first subset based on the resource allocation, wherein the second set of uplink channel transmission repetitions is transmitted with a first number of repetition occasions greater than a second number of repetition occasions used in the first set of uplink channel transmission repetitions.

In Clause 15, the method of any of clauses 1-14 includes that the first number of repetition occasions includes uplink channel transmission repetitions on non-consecutive occasions of the first number of repetition occasions.

In Clause 16, the method of any of clauses 1-15 includes that the second set of uplink channel transmission repetitions is transmitted with a same repetition pattern as the first set of uplink channel transmission repetitions.

In Clause 17, the method of any of clauses 1-16 includes that the second set of uplink channel transmission repetitions is transmitted with uplink channel transmission repetitions separated by a same interval between two adjacent repetitions as the first set of uplink channel transmission repetitions.

In Clause 18, the method of any of clauses 1-17 includes that the second set of uplink channel transmission repetitions is transmitted with a different repetition pattern than the first set of uplink channel transmission repetitions.

In Clause 19, the method of any of clauses 1-18 includes that the second set of uplink channel transmission repetitions is transmitted with uplink channel transmission repetitions separated by a different interval between two adjacent repetitions than the first set of uplink channel transmission repetitions.

In Clause 20, the method of any of clauses 1-19 includes receiving, from the base station over a downlink channel, control information indicating a resource allocation, a predetermined repetition pattern and a starting location per repetition occasion for the second set of uplink channel transmission repetitions, wherein the transmitting the second set of uplink channel transmission repetitions with the first subset and the second subset comprises: delaying transmission of the second set of uplink channel transmission repetitions to a starting repetition occasion based on the resource allocation, wherein the starting repetition occasion includes one or more first available uplink symbols that correspond to a configured uplink physical channel resource; and delaying each uplink channel transmission repetition in the second set of uplink channel transmission repetitions to a designated location within each repetition occasion of the resource allocation for a number of repetition occasions corresponding to a number of total repetitions in the second set of uplink channel transmission repetitions, wherein each uplink channel transmission repetition in the second set of uplink channel transmission repetitions has one or more of a same time location or same frequency location in the resource allocation as a respective repetition occasion based on the predetermined repetition pattern.

In Clause 21, the method of any of clauses 1-19 includes receiving, from the base station over a downlink channel through semi-persistent scheduling (SPS) signaling, control information indicating a predetermined repetition pattern and a plurality of K1 parameter values associated with a downlink data transmission, wherein each of the plurality of K1 parameter values includes a different time offset between a downlink data transmission and an associated uplink transmission; selecting a first K1 parameter value from the plurality of K1 parameter values that provides a number of repetition occasions with valid uplink resources for a number of total repetitions in the second set of uplink channel transmission repetitions; and delaying transmission of the second set of uplink channel transmission repetitions to a starting repetition occasion of the number of repetition occasions based on the first K1 parameter value, wherein each uplink channel transmission repetition in the second set of uplink channel transmission repetitions has one or more of a same time location or same frequency location with a respective repetition occasion based on the predetermined repetition pattern.

In Clause 22, the method of any of clauses 1-21 includes receiving, from the base station over a downlink channel, control information indicating a predetermined repetition pattern and a resource allocation; and determining a first available repetition occasion for each uplink channel transmission repetition in the second set of uplink channel transmission repetitions from a number of repetitions occasions indicated in the resource allocation, wherein each interval between two adjacent repetitions of the second set of uplink channel transmission repetitions is not lesser than an interval included in the predetermined repetition pattern.

In Clause 23, the method of any of clauses 1-22 includes that determining whether one or more uplink channel transmission repetitions in the second set of uplink channel transmission repetitions are scheduled to occur prior to a predetermined expiration time; determining that one or more uplink channel transmission repetitions in the second set of uplink channel transmission repetitions are scheduled not to occur prior to the predetermined expiration time; and refraining from transmitting the one or more uplink channel transmission repetitions in the second set of uplink channel transmission repetitions that are scheduled not to occur prior to the predetermined expiration time.

In Clause 24, the method of any of clauses 1-23 includes determining whether one or more uplink channel transmission repetitions in the second set of uplink channel transmission repetitions overlap with one or more uplink channel transmission repetitions of the first set of uplink channel transmission repetitions; and selecting one or more uplink channel transmission repetitions from either the second set of uplink channel transmission repetitions or the first set of uplink channel transmission repetitions for transmission when the one or more uplink channel transmission repetitions of the second set of uplink channel transmission repetitions overlap with the one or more uplink channel transmission repetitions of the first set of uplink channel transmission repetitions.

In Clause 25, the method of any of clauses 1-24 includes that the downlink transmission comprises a dynamic grant (DG) physical downlink shared channel (PDSCH), and wherein each of the second set of uplink channel transmission repetitions comprises a semi-persistent scheduling (SPS) physical uplink control channel (PUCCH) repetition.

Clause 26 is a device including one or more processors and one or more memories in electronic communication with the one or more processors storing instructions executable by the one or more processors to cause the system or apparatus to implement a method as in any of Clauses 1 to 25.

Clause 27 is a system or apparatus including means for implementing a method or realizing an apparatus as in any of Clauses 1 to 25.

Clause 28 is a non-transitory computer readable medium storing instructions executable by one or more processors to cause the one or more processors to implement a method as in any of Clauses 1 to 25.

Clause 29 is a method of wireless communication at a base station that includes transmitting, to a user equipment (UE) over a downlink channel, a first downlink transmission comprising a configuration indicating a request to retransmit a first subset of a first set of uplink channel transmission repetitions that overlaps with at least a portion of a second downlink transmission; and receiving, from the UE over an uplink channel, a second set of uplink channel transmission repetitions comprising the first subset of the first set of uplink channel transmission repetitions and a second subset of the first set of uplink channel transmission repetitions, the second subset comprising one or more uplink channel transmission repetitions that do not overlap with the second downlink transmission, wherein the second set of uplink channel transmission repetitions does not overlap with the second downlink transmission.

In Clause 30, the method of Clause 29 includes transmitting, to the UE over a downlink channel, a configuration indicating a request to retransmit one or more uplink channel transmission repetitions that overlap with the at least a portion of the second downlink transmission.

In Clause 31, the method of Clause 29 or Clause 30 includes receiving, from the UE over an uplink channel, the second set of uplink channel transmission repetitions with the first subset based on the configuration, wherein the second set of uplink channel transmission repetitions excludes the second subset.

In Clause 32, the method of any of Clauses 29-31 includes transmitting, to the UE over a downlink channel, a configuration indicating a request to retransmit one or more uplink channel transmission repetitions that overlap with the at least a portion of the second downlink transmission and transmit one or more uplink channel transmission repetitions that do not overlap with the second downlink transmission.

In Clause 33, the method of any of Clauses 29-32 includes transmitting, to the UE over a downlink channel through semi-static or dynamic signaling, a configuration indicating a number threshold, wherein the receiving the second set of uplink channel transmission repetitions comprises receiving, from the UE over the uplink channel, the second set of uplink channel transmission repetitions with the first subset and the second subset based on the number threshold.

In Clause 34, the method of any of Clauses 29-33 includes transmitting, to the UE over a downlink channel through semi-static or dynamic signaling, a configuration indicating a percentage threshold, wherein the receiving the second set of uplink channel transmission repetitions comprises receiving, from the UE over the uplink channel, the second set of uplink channel transmission repetitions with the first subset and the second subset based on the percentage threshold.

In Clause 35, the method of any of Clauses 29-34 includes transmitting, to the UE over a downlink channel, control information indicating a first physical layer (PHY) priority or a second PHY priority associated with the first set of uplink channel transmission repetitions, the first PHY priority being higher than the second PHY priority.

In Clause 36, the method of any of Clauses 29-35 includes that the second set of uplink channel transmission repetitions comprising the first subset and the second subset is received with a same number of total repetitions as the first set of uplink channel transmission repetitions.

In Clause 37, the method of any of Clauses 29-36 includes that the second set of uplink channel transmission repetitions comprising the first subset and excluding the second subset is received with a same number of dropped repetitions as the first subset of the first set of uplink channel transmission repetitions.

In Clause 38, the method of any of Clauses 29-37 includes that the second set of uplink channel transmission repetitions is received with a first number of repetition occasions greater than a second number of repetition occasions used in the first set of uplink channel transmission repetitions.

In Clause 39, the method of any of Clauses 29-38 includes that the first number of repetition occasions includes uplink channel transmission repetitions on non-consecutive occasions of the first number of repetition occasions.

In Clause 40, the method of any of Clauses 29-39 includes that the second set of uplink channel transmission repetitions is received with a same repetition pattern as the first set of uplink channel transmission repetitions.

In Clause 41, the method of any of Clauses 29-40 includes that the second set of uplink channel transmission repetitions is received with uplink channel transmission repetitions separated by a same interval between two adjacent repetitions as the first set of uplink channel transmission repetitions.

In Clause 42, the method of any of Clauses 29-41 includes that the second set of uplink channel transmission repetitions is received with a different repetition pattern than the first set of uplink channel transmission repetitions.

In Clause 43, the method of any of Clauses 29-42 includes that the second set of uplink channel transmission repetitions is received with uplink channel transmission repetitions separated by a different interval between two adjacent repetitions than the first set of uplink channel transmission repetitions.

In Clause 44, the method of any of Clauses 29-43 includes transmitting, to the UE over a downlink channel, control information indicating a resource allocation, a predetermined repetition pattern and a starting location per repetition occasion for the second set of uplink channel transmission repetitions, wherein the receiving the second set of uplink channel transmission repetitions with the first subset and the second subset comprises: receiving a delayed transmission of the second set of uplink channel transmission repetitions at a starting repetition occasion based on the resource allocation; and receiving a delayed transmission of each uplink channel transmission repetition in the second set of uplink channel transmission repetitions at a designated location within each repetition occasion for a number of repetition occasions that corresponds to a number of total repetitions in the second set of uplink channel transmission repetitions, wherein each uplink channel transmission repetition in the second set of uplink channel transmission repetitions has one or more of a same time location or same frequency location with a respective repetition occasion based on the predetermined repetition pattern.

In Clause 45, the method of any of Clauses 29-44 includes transmitting, to the UE over a downlink channel through semi-persistent scheduling (SPS) signaling, control information indicating a predetermined repetition pattern and a plurality of K1 parameter values associated with a downlink data transmission; and receiving a delayed transmission of the second set of uplink channel transmission repetitions at a starting repetition occasion of the number of repetition occasions based on a first K1 parameter value of the plurality of K1 parameter values, wherein each uplink channel transmission repetition in the second set of uplink channel transmission repetitions has one or more of a same time location or same frequency location with a respective repetition occasion based on the predetermined repetition pattern.

In Clause 46, the method of any of Clauses 29-45 includes transmitting, to the UE over a downlink channel, control information indicating a predetermined repetition pattern, wherein each interval between two adjacent repetitions of the second set of uplink channel transmission repetitions is not lesser than an interval included in the predetermined repetition pattern.

Clause 47 is a device including one or more processors and one or more memories in electronic communication with the one or more processors storing instructions executable by the one or more processors to cause the system or apparatus to implement a method as in any of Clauses 29 to 46.

Clause 48 is a system or apparatus including means for implementing a method or realizing an apparatus as in any of Clauses 29 to 46.

Clause 49 is a non-transitory computer readable medium storing instructions executable by one or more processors to cause the one or more processors to implement a method as in any of Clauses 29 to 46.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more.". Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration.". Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means.". As such, no claim element is to be construed as a means plus function unless the element is expressly recited using the phrase "means for.".

What is claimed is:

1. An apparatus for wireless communication at a user equipment (UE), the apparatus comprising:
a transceiver;
at least one processor; and
a memory, coupled to the at least one processor and the transceiver, storing computer executable code which, when executed by the at least one processor, causes the apparatus to:
obtain data for repeated uplink transmissions via a first set of uplink resources transmission occasions;
transmit, via the transceiver, the repeated uplink transmissions of the data via a second set of uplink transmission occasions and a first subset of the first set of uplink transmission occasions based on a determination that at least one uplink transmission occasion of the first set of uplink transmission occasions overlaps with a first downlink transmission, wherein the first subset of the first set of uplink transmission occasions and the second set of uplink transmission occasions do not overlap with the first downlink transmission; and
drop the at least one uplink transmission occasion based on the at least one uplink transmission occasion overlapping with the first downlink transmission.

2. The apparatus of claim 1, wherein the at least one processor is further configured to cause the apparatus to:
transmit the repeated uplink transmissions via the first set of uplink transmission occasions based on a determination that the first set of uplink transmission occasions do not overlap with the first downlink transmission.

3. The apparatus of claim 1, wherein the first subset comprises less than all of the uplink transmission occasions of the first set of uplink transmission occasions.

4. The apparatus of claim 1, wherein the at least one processor is further configured to cause the apparatus to:
refrain from transmitting the repeated uplink transmissions via the at least one uplink transmission occasion that overlaps with the first downlink transmission.

5. The apparatus of claim 1, wherein the second set of uplink transmission occasions occur after the first set of uplink transmission occasions.

6. The apparatus of claim 1, wherein the at least one processor is further configured to cause the apparatus to:
receive, by the transceiver via a downlink channel, control information indicating the second set of uplink transmission occasions.

7. The apparatus of claim 1, wherein the second set of uplink transmission occasions are separate from the first set of uplink transmission occasions.

8. The apparatus of claim 1, wherein the at least one processor is further configured to cause the apparatus to:
receive, via a downlink channel, a second downlink transmission comprising a configuration indicating a request for the UE to transmit the repeated uplink transmissions of the data via the first set of uplink transmission occasions comprising the at least one uplink transmission occasion that overlaps with the first downlink transmission.

9. A method of wireless communication at a user equipment, the method comprising:
obtaining data for repeated uplink transmissions via a first set of uplink transmission occasions;
transmitting the repeated uplink transmissions via a second set of uplink transmission occasions and a first subset of the first set of uplink transmission occasions based on a determination that at least one uplink transmission occasion of the first set of uplink transmission occasions overlaps with a downlink transmission, wherein the first subset of the first set of uplink transmission occasions and the second set of uplink transmission occasions do not overlap with the downlink transmission; and
drop the at least one uplink transmission occasion based on the at least one uplink transmission occasion overlapping with the downlink transmission.

10. The method of claim 9, wherein the method further comprises transmitting the repeated uplink transmissions via the first set of uplink transmission occasions based on a determination that the first set of uplink transmission occasions do not overlap with the downlink transmission.

11. The method of claim 9, wherein the first subset comprises less than all of the uplink transmission occasions of the first set of uplink transmission occasions.

12. The method of claim 9, wherein the method further comprises refraining from transmitting the repeated uplink transmissions via the at least one uplink transmission occasion that overlaps with the downlink transmission.

13. The method of claim 9, wherein the second set of uplink transmission occasions occur after the first set of uplink transmission occasions.

14. The method of claim 9, wherein the method further comprises:
receiving, via a downlink channel, control information indicating the second set of uplink transmission occasions.

15. The method of claim 9, wherein the second set of uplink transmission occasions are separate from the first set of uplink transmission occasions.

16. An apparatus for wireless communication at a base station, the apparatus comprising:
a transceiver;
at least one processor; and
a memory, coupled to the at least one processor and the transceiver, storing computer executable code, which when executed by the at least one processor, causes the apparatus to:
transmit, to a user equipment (UE) over a downlink channel, a first downlink transmission comprising a configuration indicating a request for the UE to transmit repeated uplink transmissions of data via a first set of uplink transmission occasions comprising at least one uplink transmission occasion that overlaps with a second downlink transmission; and
receive, from the UE via the transceiver, the repeated uplink transmissions of the data via a second set of uplink transmission occasions and a first subset of the first set of uplink transmission occasions, wherein the first subset of the first set of uplink transmission occasions and the second set of uplink transmission occasions do not overlap with the first downlink transmission, and wherein a quantity of the at least one uplink transmission occasion is equal to a quantity of repeated uplink transmissions of the data dropped from the first set of uplink transmission occasions.

17. The apparatus of claim 16, wherein the first subset comprises less than all of the uplink transmission occasions of the first set of uplink transmission occasions.

18. The apparatus of claim 16, wherein the second set of uplink transmission occasions occur after the first set of uplink transmission occasions.

* * * * *